(12) United States Patent
Vermeulen et al.

(10) Patent No.: US 10,542,068 B2
(45) Date of Patent: *Jan. 21, 2020

(54) CHECKPOINTING SHARED STATE IN DISTRIBUTED SYSTEMS

(71) Applicant: Amazon Technologies, Inc., Seattle, WA (US)

(72) Inventors: Allan Henry Vermeulen, Corvallis, OR (US); Timothy Andrew Rath, Des Moines, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

This patent is subject to a terminal disclaimer.

(21) Appl. No.: 15/437,376

(22) Filed: Feb. 20, 2017

(65) Prior Publication Data

US 2017/0163722 A1 Jun. 8, 2017

Related U.S. Application Data

(60) Continuation of application No. 14/223,952, filed on Mar. 24, 2014, now Pat. No. 9,578,080, which is a division of application No. 12/887,042, filed on Sep. 21, 2010, now Pat. No. 8,694,639.

(51) Int. Cl.
*H04L 29/08* (2006.01)
*H04L 12/911* (2013.01)
*H04L 29/06* (2006.01)

(52) U.S. Cl.
CPC ............. *H04L 67/02* (2013.01); *H04L 47/82* (2013.01); *H04L 67/1008* (2013.01); *H04L 67/42* (2013.01)

(58) Field of Classification Search
CPC ......... H04L 29/08135; H04L 29/08549; H04L 67/42; H04L 47/82; H04L 67/10; H04L 67/1008; H04L 67/1097; H04L 67/783; G06F 9/3863; G06F 11/1407
See application file for complete search history.

(56) References Cited

U.S. PATENT DOCUMENTS

| 4,665,520 A | 5/1987 | Strom et al. |
| 5,212,788 A | 5/1993 | Lomet et al. |
| 5,261,085 A | 11/1993 | Lampon |
| 5,301,309 A * | 4/1994 | Sugano ............... G06F 11/1438 714/12 |
| 5,553,239 A | 9/1996 | Heath et al. |

(Continued)

OTHER PUBLICATIONS

U.S. Appl. No. 13/528,271, filed Jun. 20, 2012, Long X. Nguyen.

(Continued)

*Primary Examiner* — Lance Leonard Barry
(74) *Attorney, Agent, or Firm* — Robert C. Kowert; Kowert, Hood, Munyon, Rankin & Goetzel, P.C.

(57) ABSTRACT

To checkpoint a shared state in a distributed system, a node may first isolate itself from communication with other nodes of a distributed system. The node may then store a checkpoint of the shared state. The node then restarts and attempts to initialize its operating state from the stored checkpoint. In response to successfully initializing its operating state, the node restores communication with one or more other nodes of the distributed system. The node then indicates to the one or more other nodes that the stored checkpoint of the shared state is valid.

20 Claims, 14 Drawing Sheets

(56) References Cited

U.S. PATENT DOCUMENTS

| | | | |
|---|---|---|---|
| 5,590,277 A * | 12/1996 | Fuchs | G06F 11/1438 714/16 |
| 5,655,112 A | 8/1997 | MacInnis | |
| 5,802,267 A | 9/1998 | Shirakihara et al. | |
| 5,828,821 A * | 10/1998 | Hoshina | G06F 11/1458 714/15 |
| 5,845,292 A | 12/1998 | Bohannon et al. | |
| 5,923,832 A | 7/1999 | Shirakihara et al. | |
| 6,078,930 A | 6/2000 | Lee et al. | |
| 6,105,148 A | 8/2000 | Chung et al. | |
| 6,169,991 B1 | 1/2001 | Tsukahara | |
| 6,332,200 B1 | 12/2001 | Meth et al. | |
| 6,374,243 B1 | 4/2002 | Kobayashi et al. | |
| 6,405,315 B1 | 6/2002 | Burns et al. | |
| 6,516,350 B1 | 2/2003 | Lumelsky et al. | |
| 7,069,317 B1 * | 6/2006 | Colrain | G06F 11/2025 709/224 |
| 7,188,251 B1 | 3/2007 | Slaughter et al. | |
| 7,249,280 B2 | 7/2007 | Lamport et al. | |
| 7,426,653 B2 | 8/2008 | Hu et al. | |
| 7,577,690 B2 | 8/2009 | Chandrasekaran et al. | |
| 7,624,047 B1 | 11/2009 | Round | |
| 7,685,597 B1 | 3/2010 | Czajkowski et al. | |
| 7,773,522 B2 | 8/2010 | Chafle et al. | |
| 7,783,610 B2 | 8/2010 | Lin et al. | |
| 7,792,980 B2 | 9/2010 | Eshel et al. | |
| 7,925,782 B2 | 4/2011 | Sivasubramanian et al. | |
| 8,037,186 B2 | 10/2011 | Dumitriu et al. | |
| 8,046,763 B1 | 10/2011 | Czajkowski et al. | |
| 8,073,941 B2 | 12/2011 | Binyamin | |
| 8,122,098 B1 | 2/2012 | Richardson et al. | |
| 8,233,490 B2 | 7/2012 | Hundscheidt et al. | |
| 8,271,437 B2 | 9/2012 | Arcese et al. | |
| 8,321,568 B2 | 11/2012 | Sivasubramanian et al. | |
| 8,429,666 B2 | 4/2013 | Bornstein et al. | |
| 8,458,517 B1 * | 6/2013 | Vermeulen | G06F 11/1474 709/201 |
| 8,654,650 B1 | 2/2014 | Vermeulen et al. | |
| 8,694,639 B1 | 4/2014 | Vermeulen et al. | |
| 8,719,432 B1 | 5/2014 | Vermeulen et al. | |
| 9,578,080 B1 | 2/2017 | Vermeulen et al. | |
| 9,578,130 B1 | 2/2017 | Nguyen | |
| 2001/0033555 A1 | 10/2001 | Kim et al. | |
| 2003/0187927 A1 | 10/2003 | Winchell | |
| 2004/0153841 A1 | 8/2004 | Beck | |
| 2005/0028160 A1 | 2/2005 | Cofer et al. | |
| 2006/0136781 A1 | 6/2006 | Lamport | |
| 2006/0179059 A1 | 8/2006 | Reed et al. | |
| 2007/0100469 A1 * | 5/2007 | Falsi | G06F 11/3696 700/11 |
| 2007/0174541 A1 * | 7/2007 | Chandrasekaran | G06F 12/0817 711/100 |
| 2008/0177830 A1 | 7/2008 | Vo et al. | |
| 2008/0208938 A1 | 8/2008 | Lin et al. | |
| 2009/0113034 A1 | 4/2009 | Krishnappa et al. | |
| 2009/0177914 A1 | 7/2009 | Winchell | |
| 2009/0287720 A1 | 9/2009 | Herter et al. | |
| 2009/0276483 A1 | 11/2009 | Lind et al. | |
| 2009/0327807 A1 | 12/2009 | Varadarajan et al. | |
| 2010/0023521 A1 | 1/2010 | Arcese et al. | |
| 2010/0161573 A1 | 6/2010 | Chan et al. | |
| 2010/0223240 A1 * | 9/2010 | Cooper | G06F 17/30321 707/696 |
| 2011/0106778 A1 | 5/2011 | Chan et al. | |

OTHER PUBLICATIONS

U.S. Appl. No. 13/528,301, filed Jun. 20, 2012, Long X. Nguyen, et al.
U.S. Appl. No. 13/528,249, filed Jun. 20, 2012, Lang X. Nguyen, et at.

* cited by examiner

CHECKPOINTING SHARED STATE IN DISTRIBUTED SYSTEMS

This application is a continuation of U.S. patent application Ser. No. 14/223,952, filed Mar. 24, 2014, now U.S. Pat. No. 9,578,080, which is a divisional of U.S. application Ser. No. 12/887,042, filed Sep. 21, 2010, now U.S. Pat. No. 8,694,639, which are hereby incorporated by reference in their entirety.

BACKGROUND

Implementing computing systems that manage large quantities of data and/or service large numbers of users often presents problems of scale. For example, as demand for various types of computing services grows, it may become difficult to service that demand without increasing the available computing resources accordingly. To facilitate scaling in order to meet demand, a particular computing service might be implemented as a distributed application that executes on a number of instances of computing hardware (e.g., server systems). For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data that they would ordinarily coordinate access to).

More generally, the larger the distributed system, the more difficult it may be to coordinate the actions of various actors within the system (e.g., owing to the difficulty of ensuring that many different actors that are potentially widely distributed have a consistent view of system state).

Figure 1:
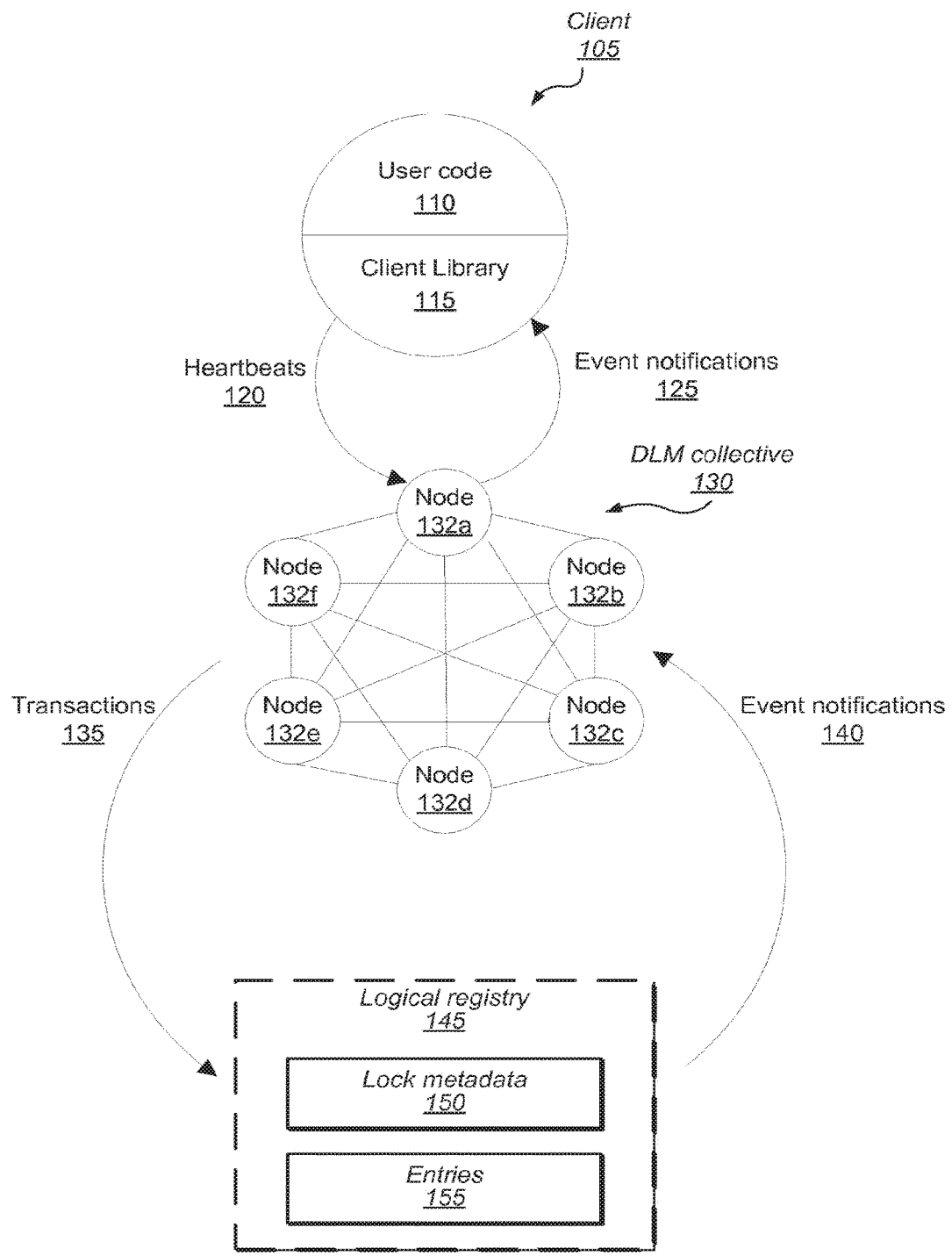
FIG. 1 illustrates the various components of a distributed lock manager (DLM), according to some embodiments.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

Distributed software applications may comprise multiple concurrent and often autonomous processes, communicating with one another and/or with shared resources across one or more networks. For example, a distributed storage service may include multiple concurrent processes executing across a distributed hardware infrastructure, such as one or more clusters of computers. (Various examples of such a storage service are described in U.S. patent application Ser. No. 11/371,304, entitled "DISTRIBUTED STORAGE SYSTEM WITH WEB SERVICES CLIENT INTERFACE" and filed Mar. 8, 2006, now U.S. Pat. No. 7,716,180, which is hereby incorporated by reference in its entirety.) Various ones of these processes may be executing on different physical and/or logical (e.g., virtual) machines in the cluster(s). In a storage service such as S3, for example, processes (e.g., software servers) on different machines may each expose a programmatic interface to clients, which the clients may use to access a single, virtual file system that may be implemented across multiple storage resources.

In order for the concurrent processes of a distributed application to cooperate successfully, it may sometimes be necessary for one or more of the processes to gain exclusive access to a given shared resource for a given period of execution. For example, a given process may require exclusive read and/or write access to a shared file, database, database entry, variable, and/or various other shared data in order to perform a series of accesses to the shared data atomically with respect to the other concurrent processes of the distributed application.

To facilitate such synchronization among the multiple concurrent processes of a distributed application, the distributed application may include a lock manager (LM). In some embodiments, the LM may associate each shared resource with a respective lock and ensure that each lock is held by at most one process of the distributed application at any given time. For example, the LM may maintain a lock registry in which it stores indications of each lock and the identity of a process (if any) that is currently holding the lock. In various embodiments, the registry may itself contain shared resources (e.g., data entries) that may each be associated with a respective lock. In some embodiments, locks may be advisory, in that the LM may not actually attempt to enforce locks. Instead, the LM may rely upon clients to cooperate with one another and to respect lock semantics.

To perform various access operations (e.g., reads, writes) to shared resources, a process should first acquire the shared resource's respective lock from the LM. A lock associated by the LM with a shared resource may be described herein as protecting the shared resource.

In different systems, the processes of a distributed application may adhere to various locking protocols. For example, in some embodiments, processes not holding a given lock may only access resources associated with that lock in a read-only manner, while in other embodiments, a process may be forbidden from accessing shared resources at all unless the process holds the lock associated with that shared resource. In various embodiments, an LM may be configured to dispense read-locks, write-locks, read/write locks, and/or various other types of locks to facilitate various locking protocols.

In some embodiments, a lock manager may itself be implemented as multiple processes executing across multiple systems as a distributed LM application. Such a lock manager may be referred to herein as a distributed lock manager (DLM). In different cases, a DLM may provide various benefits over a non-distributed LM, such as higher availability and/or throughput. For example, a DLM implemented on a cluster of computers may allow a client to interact with any of a plurality of the computers in order to acquire and/or release locks. Thus, the DLM may be more resilient in case of a hardware and/or software malfunction. Additionally, a DLM may facilitate higher throughput of lock acquisition/release operations by utilizing collective resources from multiple machines.

Overview of Distributed Lock Manager

FIG. 1 illustrates the various components of a DLM, according to some embodiments. In the illustrated embodiment, client 105 may be any program, or part of a program, that is configured to use a DLM such as 130 for synchronization. For example, client 105 may be a node of a distributed storage service application (e.g., S3) that is configured to receive customer requests over a network and in response, perform various functions on behalf of those customers. In some embodiments, client 105 may correspond to one or more computer systems configured to implement the features discussed below.

In the illustrated embodiment, client 105 comprises user code 110 and client library 115. Client library 115 may be a software library that exposes a programmatic interface to user code 110 for interacting with DLM 130. In various embodiments, the user code 110 may invoke various methods of the client library 115 to interact with the DLM 130 over a network, access different constants and/or variables of client library 115, and/or otherwise access data and functionality of the client library 115. In some embodiments, the client library may read data from the DLM, update data in the DLM, and/or listen for events notifications 125 from the DLM.

According to the illustrated embodiment, client 105 (in addition to various other clients) may communicate with DLM 130 to participate in a synchronization (i.e., locking) protocol with other clients. In some embodiments, client 105 may keep a cache of data recently received from the DLM, a clock, indications of requests submitted to the DLM on behalf of one or more customers, and/or may invoke methods of client library 115 to read lock metadata from the DLM.

Since the DLM is distributed in nature, it may be implemented across multiple nodes, such as DLM collective 130. In some embodiments, each node 132 may be a different physical and/or virtual machine. In other embodiments, two or more of nodes 132 may be different software instances executing on the same physical or virtual machine.

As illustrated in FIG. 1, a client such as 105 may communicate with DLM collective 130 via a node of the DLM, such as node 132. In various embodiments, different clients may communicate with different nodes. The particular node chosen by a client may depend on the identity of the client, the type of request, and/or other factors. In some embodiments, a client may maintain affinity to a given node once communication and/or another relationship has been established. It may also be possible for a client that has established affinity with a first node of the DLM collective to switch to another node at any time. This may be done arbitrarily, in response to a node failure, in response to the node becoming overloaded, in response to a scheduler component indicating that the client should switch to another node, and/or in response to various other events.

As shown in the illustrated embodiment of FIG. 1, the various nodes 132 of DLM collective 130 may communicate with one another via network connections. These network connections may be implemented using various types of networks (e.g., Myrinet, Ethernet, Gigabit Ethernet, etc.) in various topologies (e.g., ring, grid, Torus, bus, etc.).

For simplicity of explanation, many of the embodiments described herein comprise a DLM implemented on a fully-connected cluster of computers, where each node 132 in the DLM collective 130 is a different physical machine in the cluster, executes a separate instance of the DLM node software, and can communicate directly with every other node 132 in the collective via a network connection. However, those skilled in the art will appreciate that various other configurations are possible using different physical and/or virtual machines, connected by different network types and/or topologies, as described above.

According to FIG. 1, nodes 132 of DLM collective 130 may work together to maintain a shared state in a logical registry, such as logical registry 145. As indicated by the dashed outline of 145, the logical registry is not necessarily a separate physical entity, but rather, a logical entity that may be implemented across multiple nodes of the DLM. For example, in some embodiments, each node may keep a respective local copy of the logical registry as a local registry. Through a consensus protocol, the nodes of the DLM collective may agree on state transitions for each node to apply to its local registry, thereby collectively maintaining a single logical registry. Each node thus maintains a cached copy of the shared state that is valid as of the last transition.

In some embodiments, each transition may be associated with a DLM time, such as in a 64-bit integer agreed upon by the collective. This time may be a physical or logical time. Each node in the DLM collective may also maintain an independent system clock separate from the collective DLM time.

Logical registry 145 may include information that may be accessed in a consistent manner by a plurality of the nodes. In some embodiments, the logical registry may include lock metadata 150, user entries 155, and/or information regarding the state of various clients, such as whether the client is up or down.

In some embodiments, the DLM may maintain multiple logical registries. In such embodiments, each logical registry may be identified by a unique name. Different logical registries may be used to store data relevant to a corresponding set of clients. For example, different distributed applications may use logical registries separate from one another. Thus, in some embodiments, DLM 130 may maintain a first logical registry of synchronization data for a first distributed application and a separate logical registry of synchronization data for a second distributed application.

Lock metadata stored in a registry may include locks, each identified by a respective path (e.g., my-registry:/orders/batch-471). The logical registry may also include various user entries (e.g., 155), each identified with a respective path. User entries may comprise information stored to the logical registry by clients, such as information to be shared with other clients. For example, when creating a lock, a client may wish to write some metadata describing the lock into an entry of the logical registry 145. In some embodiments, such entries may include a name, value, creation time, and/or a modification time (DLM time). In some embodiments, a logical registry may also list named clients and/or client sessions recognized by the DLM. Such listings may also include configuration parameters for those clients and/or statuses. For example, in some embodiments, a named client may be alternatively listed as either registered, revoked, or forgotten.

A DLM may act as a mediator between the clients (e.g., 105) and one or more logical registries. The client may interact with a logical registry by submitting transactions to the DLM, which may interact with the logical registry on behalf of the client. Through a read transaction, a client may read information such as locks, entries, and/or named clients from the logical registry. Using a write transaction, a client may update information in the logical registry. In some embodiments, the DLM may also execute a check transaction on behalf of the client. In such transactions, the DLM may determine whether the context of the transaction is what the client expected. For example, optimistic writes may be implemented by checking that an entry has not been modified since a specified DLM time.

Each transaction may have different possible outcomes. In some embodiments, these outcomes may correspond to success-write, success-read, abort, and fail. A success-write outcome indicates that the transaction was executed successfully, all checks passed, and the registry updated. A success-read outcome indicates that the transaction executed successfully but did not make any changes to the logical registry. An abort outcome indicates that the transaction was aborted for some reason other than the particular contents of the transaction. In various embodiments, the DLM may abort and/or reattempt a transaction for different reasons. A fail outcome indicates that the transaction failed, for example, because one or more checks in the transaction failed, a lock creation failed because the lock already exists, the request contained a syntax error, and/or for various other reasons.

The DLM may determine the outcome of various transactions and route event notifications (e.g., 125) to interested clients. Clients may register to receive some or all events. For example, in some embodiments, the DLM may be configured to forward all event notifications to every client by default, but to allow each client to set up various filters to indicate the types of events in which it is interested. In some embodiments a client may place a watch on a path of the logical registry, thereby registering its interest in changes to that path and/or its sub-paths. In response, the DLM may send notifications to the client in the event that any locks and/or entries associated with a path or sub-path that the client is watching change. In some embodiments, such watches may be local to a specific DLM node, while in others they may be stored as shared state in the logical registry. Though logical registry 145 may be a logical entity, event notifications 140 are shown in FIG. 1 to indicate that a notification is recognized by the DLM collective in response to a change being applied to data stored in the logical registry.

In some cases, a client may attempt to use event notifications to keep a consistent cache of all or part of the logical registry. Such a client may update the cache in response to receiving relevant notifications from the DLM. Various other notifications and responses are possible. In some embodiments, each event notification is labeled with a physical and/or logical timestamp from which the client can infer bounds on the age of the event. Timestamps and event staleness will be discussed in further detail below.

As described above, clients such as client 105 may initiate transactions by communicating with a node (e.g., 132*a*) of the DLM collective. Transactions may be used to read, insert, remove, and/or modify data stored in the logical registry. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client.

In some embodiments, the DLM may execute a failure detection service to detect failures among different nodes. For example, if a given node in the DLM collective crashed or became otherwise unresponsive, the failure detection service may determine this. In some embodiments, a failure detection service may be executed across the collective in a distributed manner. In some embodiments, the failure detection service may also determine whether particular clients have become unresponsive, for example, by monitoring heartbeat messages 120, from various clients.

Figure 2:
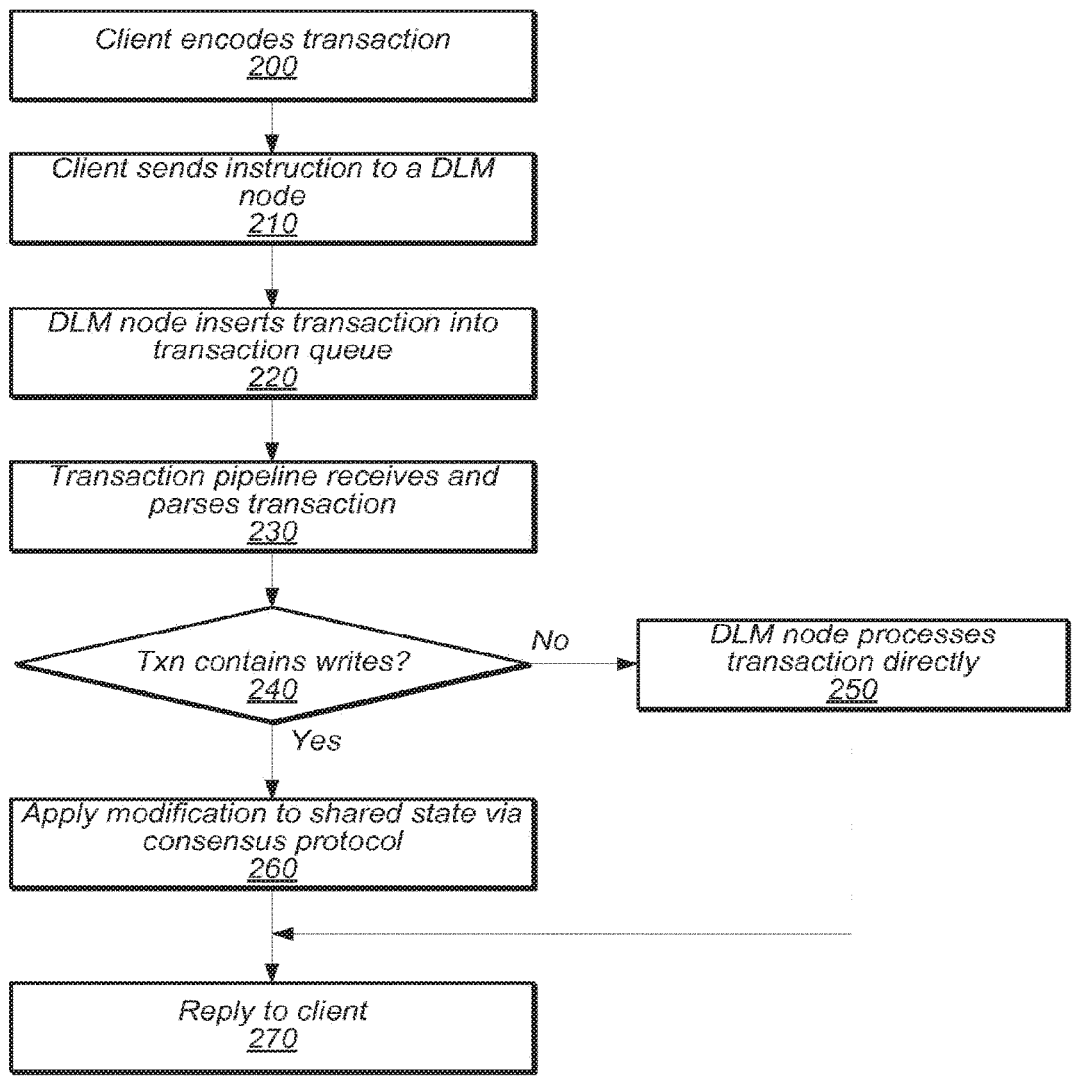
FIG. 2 is a flow diagram illustrating a method of a client interacting with a DLM collective to execute a transaction, according to some embodiments.

FIG. 2 is a flow diagram illustrating a method of a client interacting with a DLM collective to execute a transaction, according to some embodiments. When user code on a client application intends to execute a given transaction on the DLM logical registry (e.g., update the logical registry to indicate that the client has acquired a given lock), it may first encode the transaction, as in 200. For example, encoding the transaction may involve invoking a client library on the client. In some embodiments, the client library may encode the transaction in a stack-based transaction language, as described above.

After creating the encoded transaction, the client may wrap the transaction in the body of a transport message according to any suitable transport protocol, and submit the wrapped transaction to a node of the DLM collective, as in 210. In some embodiments, the client may contact any of a plurality of DLM nodes of the collective.

Upon receiving the wrapped transaction sent in 210, the DLM node may unwrap the message and insert the encoded transaction into a queue in a transaction pipeline, as in 220. In some embodiments, the nodes of a DLM collective may share the same transaction pipeline.

The instruction pipeline may then receive and parse the encoded transaction, as in 230. If the transaction does not contain any write operations to the logical registry (as indicated by the negative exit from 240) then the DLM node may process the transaction directly (as in 250) and reply to the client with a status message and/or any data requested (as in 270).

If however, the transaction does contain write operations, as indicated by the affirmative exit from 240, then the DLM may modify the shared state. A transaction that includes writes may be referred to herein as a modifying transaction. Since multiple DLM nodes maintain the shared state, the DLM node that received the request may apply the writes by initiating a consensus protocol (e.g., Paxos) among these multiple nodes of the collective, as in 260, before replying to the client with the result, as in 270.

Many variations are possible for executing write operations to shared state using consensus protocols. In some embodiments, the receiving node may first execute the transaction locally without applying the write operations to the shared state and then, only after all writes are known, apply the changes to the shared state via a consensus protocol. For example, as the node executes a transaction, the node may create a change request in addition to the normal stack. The change request may include a list of logical registry items read by the transaction execution (i.e., the read-set) and a list of writes to perform (i.e., the write-set). When the node finishes executing the transaction and the write-set is complete, then the modifications in the write-set may be made to the logical registry via a consensus protocol. In different circumstances, the DLM may also confirm that various data items in the read-set have not been modified before committing the changes in the write-set.

In some embodiments, performing the writes via a consensus protocol may include passing the completed change request to a predetermined one of the DLM nodes (primus), directly or via a queue, for processing. For example, the primus may accept a completed change request and act as the leader in a Paxos protocol to reach consensus on committing the changes to the shared state. In some embodiments, apart from its role in coordinating consensus protocol activities (e.g., in receiving change requests, proposing changes to the jury as described below, and/or communicating jury decisions), the primus may be otherwise similar or identical to other nodes of the DLM. In various embodiments, the primus may be selected from any of the nodes according to any suitable protocol, such as nomination or self-nomination, with or without election. If a primus fails during DLM operation, a new primus may be selected.

Figure 3:
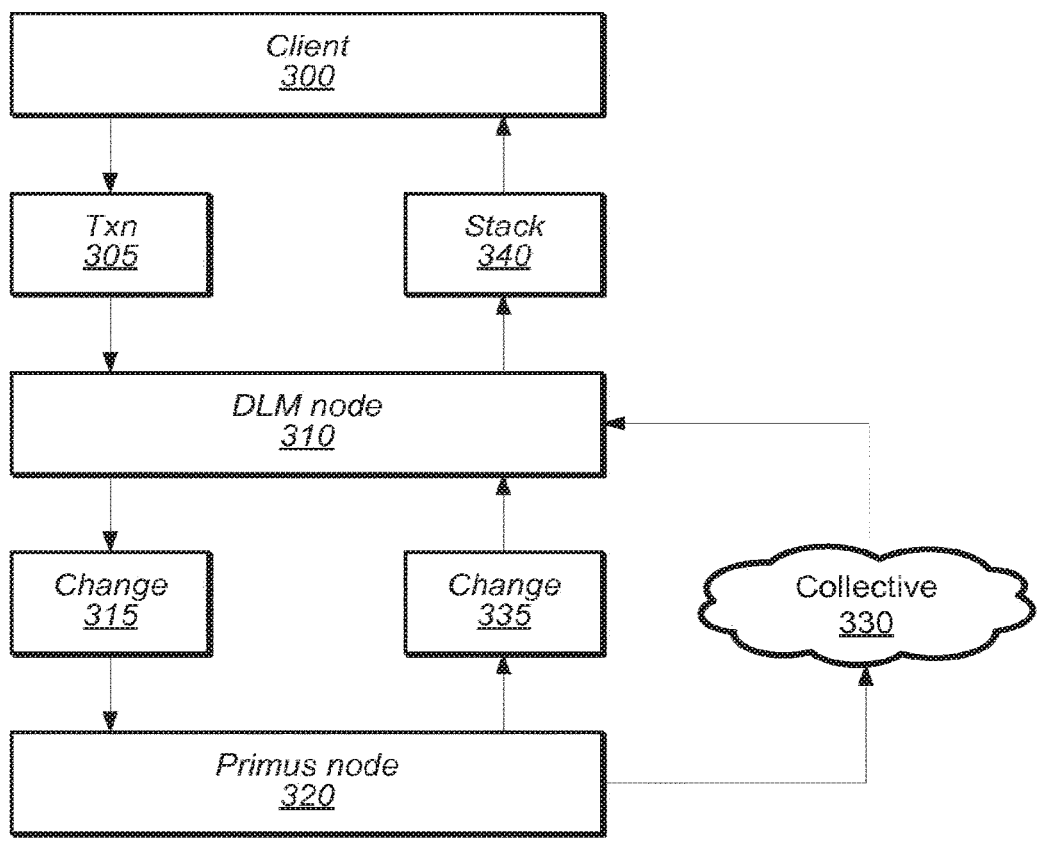
FIG. 3 is a flow diagram illustrating the flow of information from a client to a DLM for executing a modifying transaction, according to some embodiments.

FIG. 3 is a flow diagram illustrating the flow of information from a client to a DLM for executing a modifying transaction, according to some embodiments. In the illustrated embodiment, client 300 creates a modifying transaction 305, which may comprise a list of operations to perform on data in the logical registry, and communicates it to a DLM node 310 of the DLM collective. Client 300 may encode transaction 305 by invoking a DLM client library on the client.

DLM node 310 may decode the transaction and execute it using its local copy of the logical registry (i.e., local registry) for needed data. For example, the DLM node may construct an empty stack and an empty change list and begin a transaction processor. The processor may execute the operations of the transaction in sequence, popping each parameter from the stack, reading information from the local registry, and pushing results back to the stack. During this transaction-processing phase, the node may avoid writing directly to the registry, since the collective must agree upon changes to the registry. Instead, the node may write state changes into a change list that it may submit to the entire collective later.

In different instances, the processing may terminate in different states. For example, the transaction processing may terminate in an error state, indicating that the transaction failed. Alternatively, the transaction processing may terminate in a failed state, indicating that a check failed (e.g., data in the read-set was modified). For read-only transactions, the transaction processing may terminate in a success state, indicating that all operations were executed successfully and that the change list is empty. For modifying transactions, the transaction may complete in a pending state, indicating that the operations of the transaction were completed successfully, but the change list is not empty.

If the transaction processing completes in a pending state, then to complete the transaction, the DLM collective must agree to modify the logical registry according to the change list. DLM node 310 may attempt to get the DLM collective to agree to commit the changes to the logical registry by initiating a consensus protocol. DLM node 310 may initiate the consensus protocol by sending the change list to a DLM node in the collective that has been predetermined as the leader. In the illustrated embodiment, DLM node 310 passes change 315 to the Primus node 320. The Primus may then propose the changes in change list 315 to other nodes in the collective 330 via a consensus protocol, such as Paxos. In some embodiments, the Primus may propose the change to only a subset of the nodes in the collective, which may be referred to herein as the jury.

Once the collective decides on whether to make the change to the shared state, the Primus may notify the DLM node 310 of the outcome (as indicated by 335). In other embodiments, DLM node 310 may discover the result by reading the shared state rather than by receiving an explicit indication from the Primus node. The DLM node 310 may then return one or more results of the transaction to client 300, such as in stack 340.

If a transaction attempt fails, then the system may reattempt execution. In some embodiments, the DLM node may be configured to automatically reattempt execution in the face of failures, according to different policies. In other embodiments, the client library on client 300 may initiate reattempts in response to being notified of transaction processing failures.

In some embodiments, a client may only perform certain modifying transactions (e.g., acquiring a lock) if it has been explicitly identified and permitted to do so by the DLM collective. For example, the DLM collective may require that in order to hold a lock, a client must first identify itself to the DLM collective and/or be allocated a client name from the logical registry. Clients that have been allocated a name by the logical registry may be referred to herein as named clients while those that have not may be referred to as anonymous clients. In some embodiments, while both named and anonymous clients may read and write entries, only named clients may hold locks. At various times, each lock may be associated with a respective list of named clients currently waiting on that lock.

Various possibilities exist for how a client name may be assigned by the logical registry. For example, in some embodiments, a client may first choose a client stem as an identifier. When the client registers for a name with a DLM node, the DLM node may construct a client name from the client stem and the DLM time of the node's local registry. The DLM node may then propose the name to the DLM collective in order to enter the name into the logical registry.

Lock Revocation

During the course of execution, various components of a distributed system may fail. For example, a given client of a DLM system may fail by crashing, by losing communication with the DLM, by becoming unresponsive, and/or by otherwise malfunctioning in a manner that may prevent it from releasing held locks. This may lead to complications for a lock service implementation. For example, if a client acquires a given lock from a DLM and then crashes, then that client is unable to explicitly request that the DLM release the lock held by the client. In the absence of proper mechanisms to detect and deal with client failures, the client may hold the lock indefinitely, thereby preventing other clients from accessing the shared resource(s) associated with that lock and potentially causing system performance degradation or deadlock.

Figure 4:
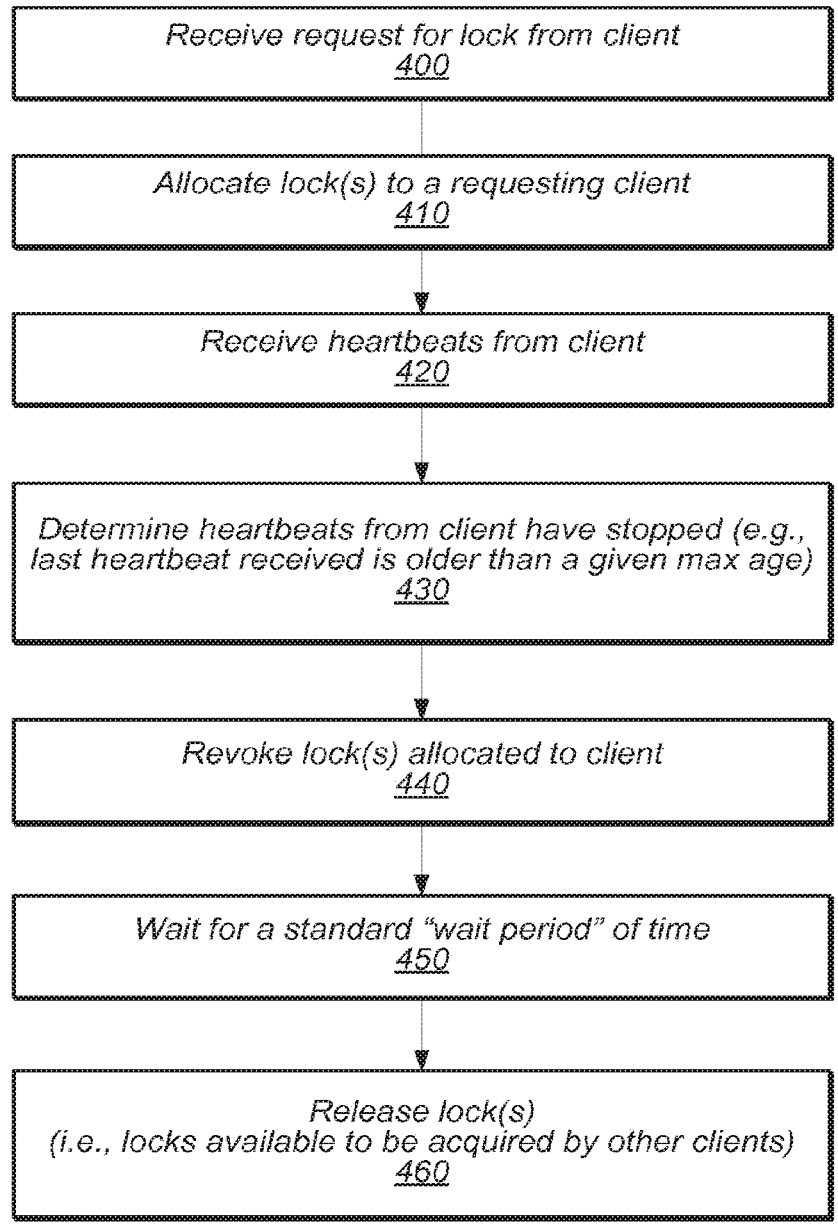
FIG. 4 is a flow diagram illustrating a method by which a DLM may detect a failed client and in response, revoke one or more locks held by that client, according to some embodiments.

According to various embodiments, a DLM may implement various revocation mechanisms and protocols to detect failed clients and revoke (i.e., release) locks held by those clients. FIG. 4 is a flow diagram illustrating a method by which a DLM may detect a failed client and in response, revoke one or more locks held by that client.

The method of FIG. 4 begins when the DLM receives a request from a client for a lock on a shared resource, as in 400. If the lock is available for acquisition (e.g., is not held by another client), then the DLM may allocate the lock to the requesting client, as in 410. In some instances, if another client holds the requested lock, then the DLM may place the requesting client in a queue of clients waiting for the lock. In this case, when the requesting client arrives at the head of the queue and the requested lock becomes available, the DLM may allocate the lock to the requesting client. While it waits, the client may block or perform other tasks, depending on the particular client logic implemented.

According to the illustrated embodiment, the DLM may allocate multiple locks to a given client in 410. This may be in response to subsequent requests for additional locks and/or in response to the request of 400 indicating a group of locks to acquire.

As illustrated, the DLM may then monitor heartbeat messages from the client, as in 420. For example, the client and/or client library may be configured to send heartbeat messages to the DLM (e.g., at regular intervals) as shown in FIG. 1. In different embodiments, the heartbeat messages may include different data, such as a client name and/or a timestamp of the heartbeat. In some embodiments, the node that receives the heartbeat may propagate that message to the other nodes in the DLM collective, such as by using a gossip protocol.

So long as the DLM continues to receive heartbeat messages from the client, it may conclude that the client has not failed, still intends to hold the locks, and/or is capable of releasing the locks when the client no longer needs them. However, if the DLM stops receiving heartbeat messages from the client, as in 430, then the DLM may suspect that the client has failed (e.g., crashed, lost communication). For example, in some embodiments, if the DLM does not receive a heartbeat message from a given client for some predefined period of time, then the DLM may determine that the client may have failed. In some embodiments, a DLM node may provide a client with a grace period in which the DLM node generates a heartbeat message on behalf of the DLM if none is received and propagates it to the collective on behalf of the client.

In response to determining that the client may have failed, the DLM may revoke the locks held by the client, as in 440. For example, the DLM may modify the logical registry to list the client as being in a revoked state. According to some embodiments, the DLM may not make the revoked locks immediately available to other clients. Instead, the DLM may move the locks into a wait state, and maintain the wait state for some predefined wait period (e.g., 20 seconds). Once the DLM has waited for the standard period of time, as in 450, it may release the locks, as in 460, such as by moving the locks into an available state and/or the client to a forgotten state. Locks that the DLM releases may be acquired by other clients.

In some embodiments, the wait period may be a standard period of time (e.g., 20 seconds) with various properties. For example, the wait period may be dependent on the interval at which clients are configured to send heartbeat messages to the DLM and/or on the maximum expected staleness, as described in the next section.

In some embodiments, the wait period for different locks may be configurable by the DLM and/or by the client. For example, if a first resource protected by a first lock requires a relatively short amount of time to access, the DLM may associate the first lock with a relatively shorter wait time than it does a second lock protecting a second resource that requires a relatively longer time to access.

In some embodiments, the wait time may also be dependent on the client, such as on how long that client may go unresponsive. For example, a Java application my perform garbage collection actions that halt application progress for relatively long periods. As such, a wait time used for a Java application may be configured to be somewhat longer to accommodate such events.

In some embodiments, the DLM may be configured to automatically determine different wait times for various locks and/or clients depending on such client-specific and/or resource-specific information. In one example, a client may send configuration information to the DLM (e.g., Java application, maximum expected unresponsive period, heartbeat interval, network latency, protected resource usage latency, etc.) such that the DLM may choose an appropriate wait time. In another example, the client may request a specific wait time from the DLM. After determining the wait time, the DLM may inform the client of the selected wait time.

In some embodiments, a client may group multiple locks into a single session, such that all the locks in the session are maintained and/or revoked together. For example, in some embodiments, a client may begin a session with a DLM and acquire multiple locks under that session. The client may then send heartbeat messages for the entire session, rather than individual heartbeat messages for each lock in the session. In some embodiments, if the DLM ceases to receive heartbeat messages from the client for a given session, the DLM may revoke and/or release all the locks in the session collectively.

Staleness in Distributed Systems

As described above, a DLM may revoke and eventually release locks held by a client that has failed. However, in some embodiments, the locks managed by a DLM may be advisory and not actually enforced by the DLM. That is, rather than forcing clients to adhere to the locking protocols, a distributed system may rely on clients voluntarily abiding by such protocols to facilitate cooperation with other clients in the distributed system.

In order for a client to self-enforce a locking protocol using advisory locks, the client should be aware of whether it holds a given lock. Therefore, if the DLM determines that a given client has failed and revokes a lock held by that client, then the client should cease using the lock before the DLM releases the lock. In some cases, such as a crashed client that does not restart, this behavior may occur naturally. However, in other cases, such as a client becoming isolated from the DLM, the client may be unaware that its locks have been revoked. Once its locks are released, such a client may be forbidden by protocol but technically still capable of using protected resources. In such cases, it is desirable that the client be configured to avoid relying on a given lock if it is possible that the DLM has released that lock.

In some embodiments, a DLM and its clients may participate in a distributed protocol by which a client may determine whether it is safe to rely on various locks it holds. For example, in some embodiments, the DLM may be configured to send occasional messages to the client confirming that the DLM has not revoked the locks held by the client. For instance, the DLM may send such messages to a client in response to receiving a heartbeat message from the client. The DLM node may make this determination by consulting its local copy of the shared state (logical registry).

In response to receiving a confirmation from the DLM that the client's locks are not revoked, the client may calculate a maximum period of time for which it is safe to use its locks (a safe time). Each time the client receives subsequent confirmations from the DLM, the client may recalculate this safe time. If the safe time elapses and the client has not received subsequent confirmations from the DLM, the client may assume it has been revoked and may not rely on the lock for accessing protected resources.

However, the confirmation that a DLM node sends to a client may contain somewhat outdated information. The age of the data that the client receives from a DLM node may be referred to herein as the staleness of the data. Data staleness may be a function of several components. For example, by the time the client receives a confirmation from a DLM node, the data in the confirmation is older than it was when the DLM node constructed the message. This time period may be referred to herein as client staleness. Additionally, because the DLM is a distributed application, the data used by the particular DLM node to construct the message received by the client may itself be dated with respect to the shared-state of the collective. This staleness may be referred to herein as node staleness.

According to various embodiments, when calculating a safe time in response to receiving a given confirmation, a client may calculate and consider a bound on the staleness of the data of the confirmation. For example, the client may determine a bound on the data staleness and calculate the safe time to be no greater than the wait period of the DLM (e.g., wait period of 450) minus the calculated staleness bound.

According to various embodiments, the client may determine an upper bound on the staleness of data received from a DLM node at least in part by determining an upper bound on the client staleness of the data and another on the node staleness of the data and determining that the overall staleness of the data is less than or equal to the sum of these two bounds.

According to some embodiments, to determine an upper bound on the client staleness of received data, a client may interact with a DLM according to the following protocol: the client may include a timestamp of a local clock in a heartbeat message sent to the DLM. If the DLM has not already revoked the client's locks, the DLM node receiving heartbeat from the client (as in 420) may respond with a confirmation that the DLM collective has not revoked the client's locks. According to some embodiments, the DLM node may echo the client timestamp contained in the heartbeat back to the client, such as by including it in the response message.

When the client receives the response message, it may determine that the message was constructed no earlier than the time indicated by that echoed timestamp. The client can therefore determine that the client staleness of the data is no greater than the client's current clock value minus the echoed timestamp. Thus, the client may determine a bound on the client staleness.

Figure 5:
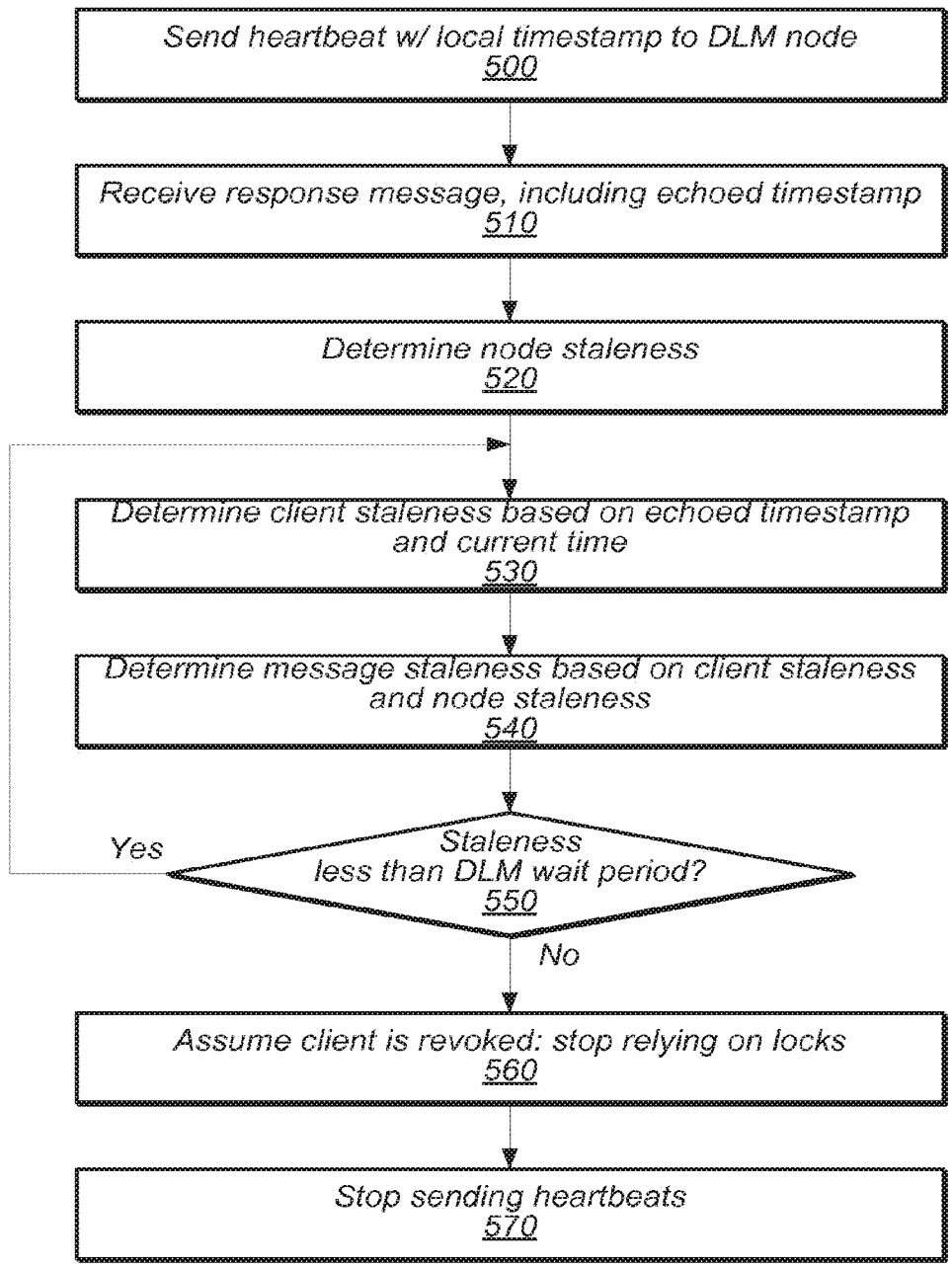
FIG. 5 is a flow diagram illustrating a method for a client to determine whether it is safe to continue using locks, according to some embodiments.

FIG. 5 is a flow diagram illustrating a method for a client to determine whether it is safe to continue using locks, according to some embodiments. The method of FIG. 5 begins when the client sends a heartbeat message that includes a local timestamp, to a node of the DLM, as in 500. The timestamp may be generated from a local system clock and may represent physical time (e.g., milliseconds since a previous epoch) or logical time (e.g., a value of a counter that is incremented based on globally-visible system events).

As in 510, the client may then receive a response to the heartbeat message, the response including the timestamp sent in 500. The response may indicate that the DLM has not revoked the client's locks. The client may then determine an upper bound on the node staleness of the received data, as in 520. In some embodiments, the node staleness bound may be included in or otherwise indicated by the response message of 510. In some embodiments, the client may calculate the node staleness bound in 520 or retrieve it from another source.

According to the illustrated embodiment, the client may then determine an upper bound on the client staleness of the data, as in 530, by comparing the echoed timestamp with the current time given by the clock that the client used to generate the timestamp sent in 500. Using the bounds on client and node staleness, the client may then determine a bound on the overall message staleness, as in 540. The client may calculate the overall bound by summing the client and node staleness bounds determined in 520 and 530.

While the staleness bound is less than the DLM wait period of the DLM (as indicated by the affirmative exit from 550), the client may use its locks (i.e., access resources protected by those locks) while repeating operations 530-550 using updated readings from the clock.

During this looping, the client may send one or more additional heartbeats with updated timestamps to the DLM to request an updated confirmation. If the DLM responds with a new response message, then the client may return to operation 510 of FIG. 5, using the new staleness data.

If the client does not receive any updates from the DLM and the data staleness eventually grows equal to or greater than the DLM wait period (as indicated by the negative exit from 550), then it is possible that the DLM may have revoked the client's locks. In this case, the client may assume it is revoked and that it no longer holds the locks. Therefore, the client ceases to rely on the locks it held for synchronization purposes, as in 560.

According to the illustrated embodiment, if the safe time has expired (i.e., data staleness is equal to or greater than DLM wait period), then the client may stop sending heartbeats, as in 570. In some cases, such as asymmetric network partitions, this may facilitate system liveness. For example, if an asymmetric network partition occurs such that heartbeats sent by the client are delivered to the DLM but responses from the DLM are not, then the DLM may never revoke the locks even though client has stopped relying on them. A client may avoid this situation by stopping sending heartbeats, as in 570, once the safe time has expired.

Consequently, the DLM may determine that the client has failed and may eventually revoke and release the locks held by the client.

As described above, in some embodiments, a DLM node sending a response to a client may include an upper bound on the node staleness of the data being sent. Recall that a DLM node may maintain a local registry, which is effectively a cache of the logical registry being maintained by the entire DLM collective as shared state. When a DLM node responds to a client heartbeat, the DLM node may use information contained in the local registry of that node, which may be somewhat stale with respect to the logical registry. Therefore, a DLM node may keep track of the staleness of its local registry and send an indication of this staleness to clients as part of some communications.

Figure 6:
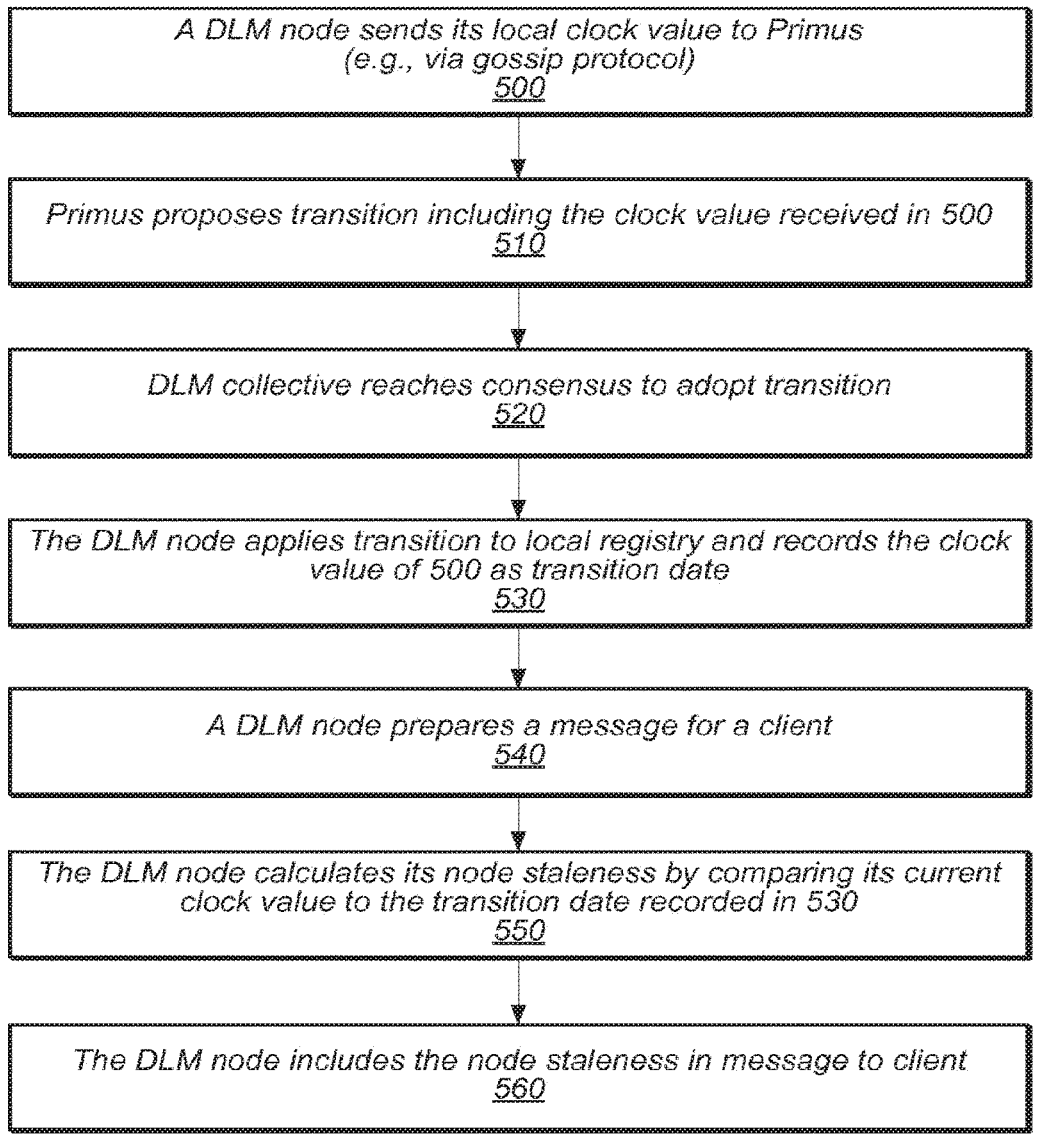
FIG. 6 is a flow diagram illustrating a method by which a DLM node calculates and includes its own node staleness in a message to a client, according to some embodiments.

FIG. 6 is a flow diagram illustrating a method by which a DLM node calculates and includes its own node staleness in a message to a client, according to some embodiments. In the illustrated embodiment, a DLM node maintains a local clock and periodically sends its local time to the primus node, as in 500. As described above, the primus node may be a node of the DLM collective tasked with some special duties for increased efficiency.

When the primus proposes the next transition, as in 510, it includes the clock value received in 500. Thus, when the DLM collective reaches consensus to adopt the proposed transition, as in 520, it effectively echoes the clock value received in 500 back to the node that sent it.

In response to the consensus, the DLM node applies the transition and records the associated clock value, as in 530. In such a situation, the DLM node is assured that the transition occurred no earlier than this clock value. Therefore, the DLM node can calculate an upper bound on the node staleness of its data by subtracting this clock value from the node's current clock value.

When a DLM node subsequently prepares a message for a client, as in 540, it may calculate its node staleness by comparing its current clock value with the clock value associated with the most recent transition, as in 550, and including that node staleness value in the message sent to the client, as in 560.

Since in many embodiments, multiple DLM nodes may communicate with various clients, multiple such nodes may periodically send their local clock values to the primus (as in 500). In such embodiments, the primus may maintain a list of named counters, where each name corresponds to a different node in the collective and each counter corresponds to the latest clock time of that node to which the primus has been notified. Consequently, when the primus proposes a transition in 510, the primus may include the named counter list. After consensus is reached on the transition in 520, each node may examine the named counter list associated with the transition to find the entry and consequently, the clock value, associated with that node in the counter list. In 530, the node may then record its own clock value associated with the transition.

In some embodiments, DLM nodes may each send their local clock values directly to the primus. However, such an approach may cause excessive workload for the primus node. Therefore, in some embodiments, the nodes of a DLM collective may communicate their clock values with the primus (and with each other) in a distributed manner, such as by using a gossip protocol.

In some embodiments, a gossip protocol may be implemented as follows: each node may maintain a list named counters, each named counter corresponding to a unique DLM node in the collective. At given intervals, a node participating in the gossip protocol may update an entry corresponding to itself in its local counter list. The updated value may be the value of the node's local clock. The node may then gossip the counter list to some subset of the other nodes.

In different embodiments, the interval at which a node gossips may be different. Variously, the node may chose the subset of nodes to which it gossips using different techniques (e.g., randomly, pseudo-randomly, from a list of nodes, in a fixed manner, according to any arbitrary selection criteria, etc.). For example, in one embodiment, a node may update and gossip its local counter list to three pseudo-randomly chosen nodes every 50 milliseconds.

When a node participating in the gossip protocol receives a counter list from another node, it may compare the received counter list to the local counter list and update any local counter list entries whose corresponding entry in the received list is higher. For example, if a local counter list contains an entry named A with a corresponding value of 5000 and the received counter list includes an entry named A with a value of 6000, then the node may update the local list such that entry A corresponds to a value of 6000. When it comes time for the local node to gossip its counter list, it may again update its own entry, choose a subset of recipient nodes, and gossip its local counter list. Thus, a DLM collective may employ a gossip protocol to communicate local clock values of various nodes to one another, including the primus (as in 500).

Figure 7:
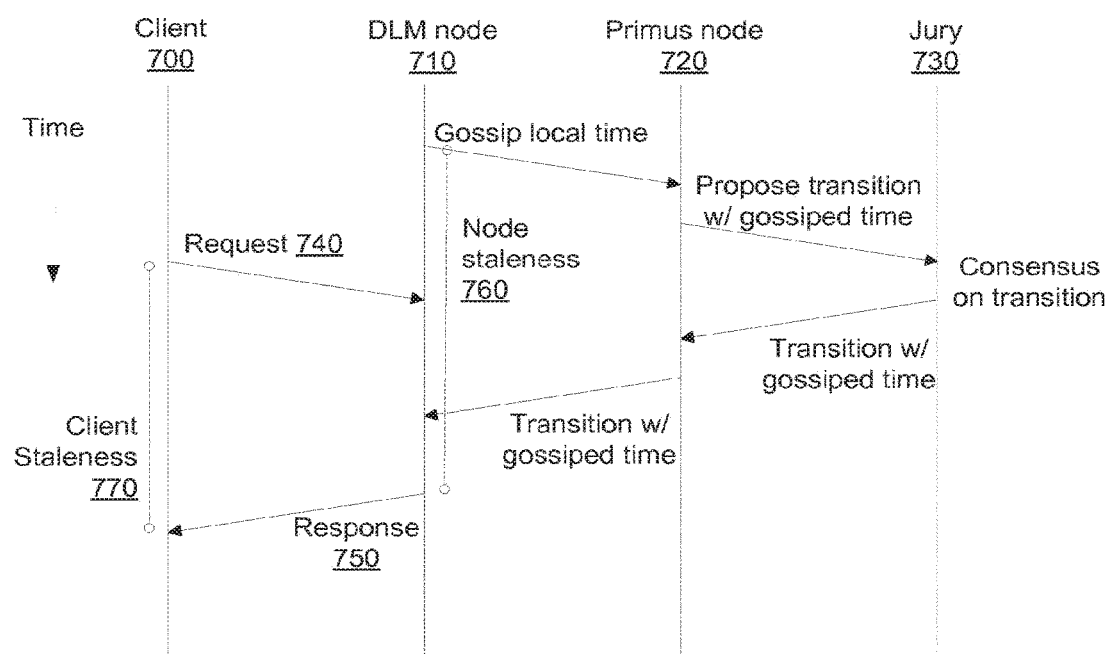
FIG. 7 illustrates the concepts of client staleness and node staleness in a DLM, according to various embodiments.

FIG. 7 illustrates the concepts of client staleness and node staleness in a DLM, according to various embodiments. In the illustrated embodiment, DLM node 710 occasionally communicates a current time to primus node 720, such as by using a gossip protocol. DLM node 710 may calculate this time based on any given clock, such as a local system clock. The clock used by DLM node 710 may be referred to herein as its node clock.

Subsequently, the primus proposes a transition that is agreed upon by the collective. The agreed upon transition may include the time that primus 720 received from DLM node 710. Thereby, the time is echoed back to DLM node 710 as shown.

When DLM node 710 receives the transition and echoed time, the node is assured that the transition was not agreed to before the echoed time. Therefore, the maximum staleness of the received transition is the current time of the node clock minus the echoed time.

In the illustrated timeline, client 700 sends request 740 to DLM node 710. Request 740 may correspond to a request to acquire or release a lock, to a heartbeat message indicating that client 700 is still using a lock, and/or various other interactions with the logical registry.

As in the method of FIG. 5, request 740 may include the current time of a client clock (e.g., a local system clock of the client). DLM node 710 may record this time and when it responds to request 740 with response 750, it may echo the received client time back to the client. When client 700 receives the echoed client time in response 750, client 700 knows that response 750 was not constructed before the echoed time. Therefore, client 700 may calculate the client staleness of the data in the response by subtracting the echoed client time from the current time on the client clock.

As described above however, client 700 may also consider the node staleness of response 750 when determining an overall staleness of response 750. In some embodiments, DLM node 710 may include an upper bound on this node staleness in response 750 as follows: DLM node 710 may prepare response 750 for client 700 using local registry data.

DLM node 710 may then calculate an upper bound on the staleness of the registry data by subtracting the echoed node time associated with the most recent transition from the current time of the node clock. This upper bound on the staleness of the message is noted in FIG. 7 as node staleness 760. DLM node 710 may then include an indication of node staleness 760 in response 750.

Upon receiving response 750, client 700 may calculate client staleness 770 as described above, determine node staleness 760 from response 750, and then determine a maximum bound on the overall staleness of response 750 by summing the node and client staleness bounds 760 and 770. Client 700 may then periodically recalculate client staleness 770 and consequently, the overall staleness of response 750.

Upon receiving response 750, client 700 may calculate client staleness 770 as described above, determine node staleness 760 from response 750, and then determine a maximum bound on the overall staleness of response 750 by summing the node and client staleness bounds 760 and 770. Client 700 may then periodically recalculate client staleness 770 and consequently, the overall staleness of response 750.

In some embodiments, it may be safe for client 700 to rely on data in response 750 so long as its overall staleness is less than the standard "wait period" of the DLM. As illustrated in FIG. 4, the wait period may denote the period of time that the DLM waits between revoking the locks held by a client (as in 440) and actually releasing the locks for other clients to acquire (as in 460).

If the overall staleness exceeds the wait period time for the system the client may stop using protected resources. In some cases, client 710 may eventually receive another response from DLM node 710. The client may then calculate the staleness of the newly received data and if it is less than the wait period, the client may resume relying on the locks.

During the course of executing, various nodes in a distributed system (e.g., DLM nodes of a DLM) may occasionally fail. In different circumstances, this may be due to a hardware failure, software failure, network partition, and/or due to various other malfunctions.

During the course of executing, various nodes in a distributed system (e.g., DLM nodes of a DLM) may occasionally fail. In different circumstances, this may be due to a hardware failure, software failure, network partition, and/or due to various other malfunctions.

Checkpointing in Distributed Systems

During the course of executing, various nodes in a distributed system (e.g., DLM nodes of a DLM) may occasionally fail. In different circumstances, this may be due to a hardware failure, software failure, network partition, and/or due to various other malfunctions.

After failing, a node may eventually return to service. For example, a node of a distributed application may be configured to respond to a crash failure (e.g., software crash) by restarting, which may include performing various integrity checks on the node and rejoining the collective. However, if the distributed application is maintaining a shared state, such as does a DLM, then the recovering node may have missed any number of state transitions and/or lost some or all of the shared state data due to the failure.

To rejoin the collective and recover the shared state, a recovering node may utilize a previously recorded checkpoint of the shared state. For example, in some embodiments, a DLM may occasionally record all or some values of the shared state (e.g., logical registry) to a persistent storage device as a checkpoint. Thus, the checkpoint may reflect the state of the logical registry at some point in time. When a crashed node recovers, the node may set values in its local registry according to those of the recorded checkpoint, thereby returning its registry to a status consistent with the logical registry at the point in time when the checkpoint was recorded. In some embodiments, the recovering node may also use various mechanisms to discover any state transitions that were adopted by the collective after the checkpoint and to implement those transitions on the node's local registry.

Figure 8:
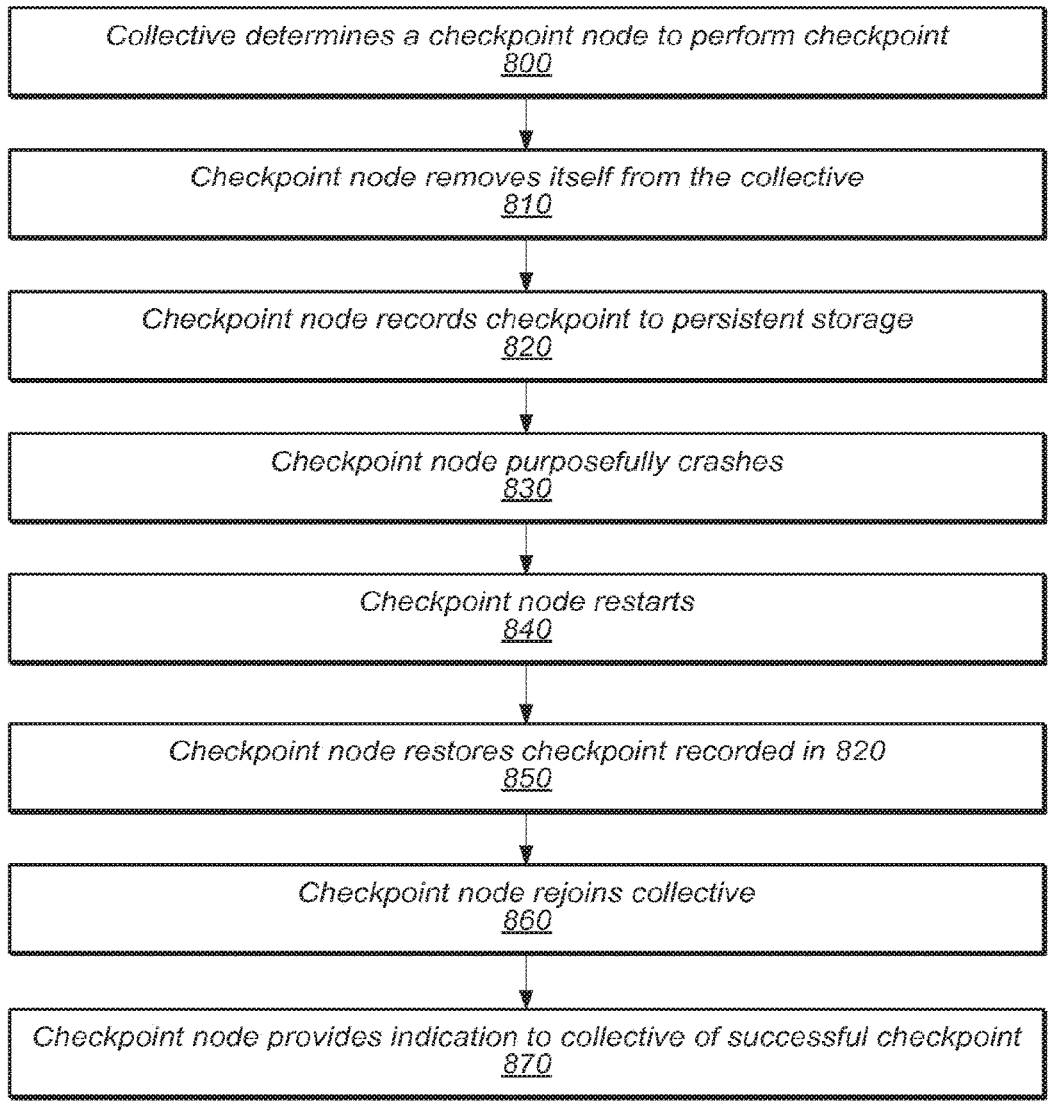
FIG. 8 is a flow diagram illustrating a method by which a distributed system, such as a DLM, may perform checkpointing and recovery, according to various embodiments.

FIG. 8 is a flow diagram illustrating a method by which a distributed system, such as a DLM, may perform checkpointing and recovery, according to various embodiments. While the method of FIG. 8 may be performed by a DLM such as those described above, in alternate embodiments, the checkpointing method may be performed by various other distributed systems that maintain shared-state. For example, the method may be used to implement checkpointing and recovery in a distributed storage system, a distributed database, or various other shared-state systems.

According to the illustrated embodiment of FIG. 8, a collective may determine a node that will record the checkpoint, as in 800. In various embodiments, different mechanisms may be used to choose the checkpointing node, such as by choosing an arbitrary node, a preconfigured node, or an elected node. For example, in some embodiments, various nodes may be configured to detect when a given checkpointing period of time has passed and in response, to propose a transition to the collective (e.g., via Paxos) indicating that the proposing node wishes to record a checkpoint. In such embodiments, although multiple nodes may propose the transition, the collective may be configured to adopt only one such proposal per checkpointing period. By collectively adopting the checkpointing proposal of a given node, the collective may agree that the proposing node will perform the checkpoint.

According to the illustrated embodiment, the chosen checkpoint node then removes itself from the collective, as in 810. This may involve severing communication with the other nodes and/or other actions that prevent the checkpoint node from receiving, implementing, and/or initiating additional shared-state transitions. By removing itself from the collective, the checkpoint node may effectively freeze the state of its own local registry. This may simplify the checkpointing process by ensuring that the registry does not change while the node creates the checkpoint.

In 820, the isolated checkpoint node creates a checkpoint and stores it on some persistent storage device. As discussed above, a checkpoint may correspond to a recording of values in the local registry, a series of transitions, and/or any other data usable to recover the values currently held in the node's local registry.

In different embodiments, the node may record the checkpoint data in 820 to any persistent storage device or devices, such as a magnetic disk, tape drive, solid-state memory, storage service, and/or any other persistent storage mechanism that persists across a crash and/or restart of the node.

After successfully recording the checkpoint, the node may purposefully crash, as in 830. In some embodiments, this crash may correspond to a restart of all or part of the system, and may or may not include performing an organized or predefined system shutdown and initialization procedure. For example, in some embodiments, the node may shut down and restart the physical or virtual computer on which the node software is executing. In other embodiments, the node may stop and restart only various portions of the software executing on the computer, such as a server, a web application, and/or a server container associated with the node software. In performing the crash of 830, the node may purposefully lose various in-memory data, such as the local registry of shared-state.

In some embodiments, the node may cause a crash using mechanisms other than a shutdown and/or restart command. For example, the node may cause various runtime errors, such as by throwing runtime exceptions, causing runtime exceptions (e.g., dividing by zero), and/or otherwise misbehaving (e.g., overflowing a buffer). In some embodiments, each time a node purposefully crashes itself, as in 830, it may choose a different or arbitrary mechanism/behavior by which to do so.

After crashing itself, the node may then restart, as in 840, and perform a recovery routine. In some embodiments, performing the recovery routine may include restoring the node's local registry according to the recorded checkpoint, as in 850. The particular process of restoring the checkpoint in 850 may vary by embodiments and/or by the format of the checkpoint. For example, if the checkpoint corresponds to a copy of the shared-state data, then in some embodiments, the recovering node may overwrite its local registry with the checkpoint data. In other embodiments, if the checkpoint comprises a series of transitions to be applied to a starting registry to arrive at the checkpointed registry state, then the node may apply those transitions to its local registry.

In some embodiments, even after restoring the checkpoint in 850, the local registry of the recovering node may still not be up to date with the shared-state of the collective. This may occur, for example, if the collective has agreed to implement one or more transitions after the checkpoint was recorded. In such cases, the recovery routine executed by the recovering node may include contacting one or more nodes in the collective to receive various transitions that were adopted by the collective after the checkpoint was recorded. In some embodiments, the checkpoint node may record a DLM time (e.g., DLM time of the most recent transition) as part of the checkpoint. When a node uses such a checkpoint to restore its local registry to the checkpointed state, the node may compare the checkpoint timestamp with that of various transitions adopted by the collective. The node may then apply transitions to its local registry that are associated with a later DLM time than that associated with the checkpoint.

As shown in the illustrate embodiment, the node may then rejoin the collective, as in 860. In some embodiments, rejoining the collective may require that the collective agree (e.g., via Paxos) on a state transition indicating that the recovered node has rejoined the collective. In some embodiments, since the recovering node is not yet part of the collective, it may not be able to directly propose such a transition. In some embodiments, the recovering node may therefore contact a sponsor node that is currently in the collective and that may propose the transition on behalf of the recovering node.

After rejoining the collective, the recovered node may notify the other nodes in the collective of the newest checkpoint, as in 870. In different embodiments, the node may send this notification using a state transition, a gossip protocol, or other means. The notification may include an indication of where the checkpoint data is stored, a DLM time associated with the checkpoint data, any errors that the node experienced while recovering using the checkpoint data, and/or other relevant information. In the event of a failure (e.g., crash failure) a notified node may recover using this checkpoint.

In some distributed system implementations, crash recovery routine code may be complex and therefore prone to errors. By checkpointing (as in 820), purposefully crashing (as in 830), and attempting to recover using the checkpoint (as in 850) before notifying other nodes of the new checkpoint data (as in 870), distributed systems implementing the method of FIG. 8 may exercise recovery code more frequently, such that code errors are detected more readily. Additionally, by bootstrapping using the recorded checkpoint before notifying others of the new checkpoint, the checkpoint node effectively validates the integrity of the checkpoint before it becomes widely relied upon by other nodes in the collective.

In some situations, the node may fail to restore the recorded checkpoint. For example, this may occur if the recorded checkpoint contains corrupted data or if the checkpoint was otherwise not recorded properly. In other instances, the checkpoint restoration may fail due to an error in the recovery routine code, a runtime error, and/or other software or hardware failures.

In cases where the recovering node is unable to restore state according to the checkpoint it just recorded, the recovering node may attempt to recover using the most recent verified checkpoint of which it is aware. That is, the node may recover using the checkpoint that was most recently recorded and successfully used for a recovery operation. The node may then rejoin the collective using procedures such as those described above.

In the event of recovery failure, the recovering node may also inform the other nodes that the recovering node was unable to record a usable checkpoint and that the collective should instead still rely on the most recent verified checkpoint. In response to this notification of failure, the collective may determine another checkpoint node to perform the checkpoint, as in 800. For example, another node of the collective may propose a shared-state transition that indicates the node will attempt to perform the next checkpoint.

Resource Allocation and Load Protection in Distributed Systems

During the course of executing, various nodes in a distributed system (e.g., DLM nodes of a DLM) may occasionally encounter a heavy workload, which may cause system performance to degrade. For example, in some DLM embodiments, the primus node may be configured to accept change requests from the other nodes and to act as the leader in the Paxos protocol. Consequently, the primus may occasionally become overloaded by workload sent to it by the other nodes. If this happens, the primus may become a bottleneck, causing system-wide performance degradation. To avoid this degradation, it may be desirable to prevent the primus from becoming overloaded.

According to various embodiments, a DLM collective may cooperate to avoid overloading the primus node, using various embodiments of distributed, adaptive load-management techniques described herein. Although the protocols are couched within the context of a DLM obviating overload of the primus node, those skilled in the art given the benefit of this disclosure will recognize that the protocols described herein may be generalized to a generic client-server environment where a server serves multiple clients.

In the following discussion, the primus node discussed above may be an example of a "server," while the other DLM nodes discussed above may correspond to "clients." However, it is noted that the load-management techniques described here may be applicable to any type of client-server system in which a server provides or manages access to a limited-capacity resource that is utilized by clients, as described in greater detail below.

Figure 9:
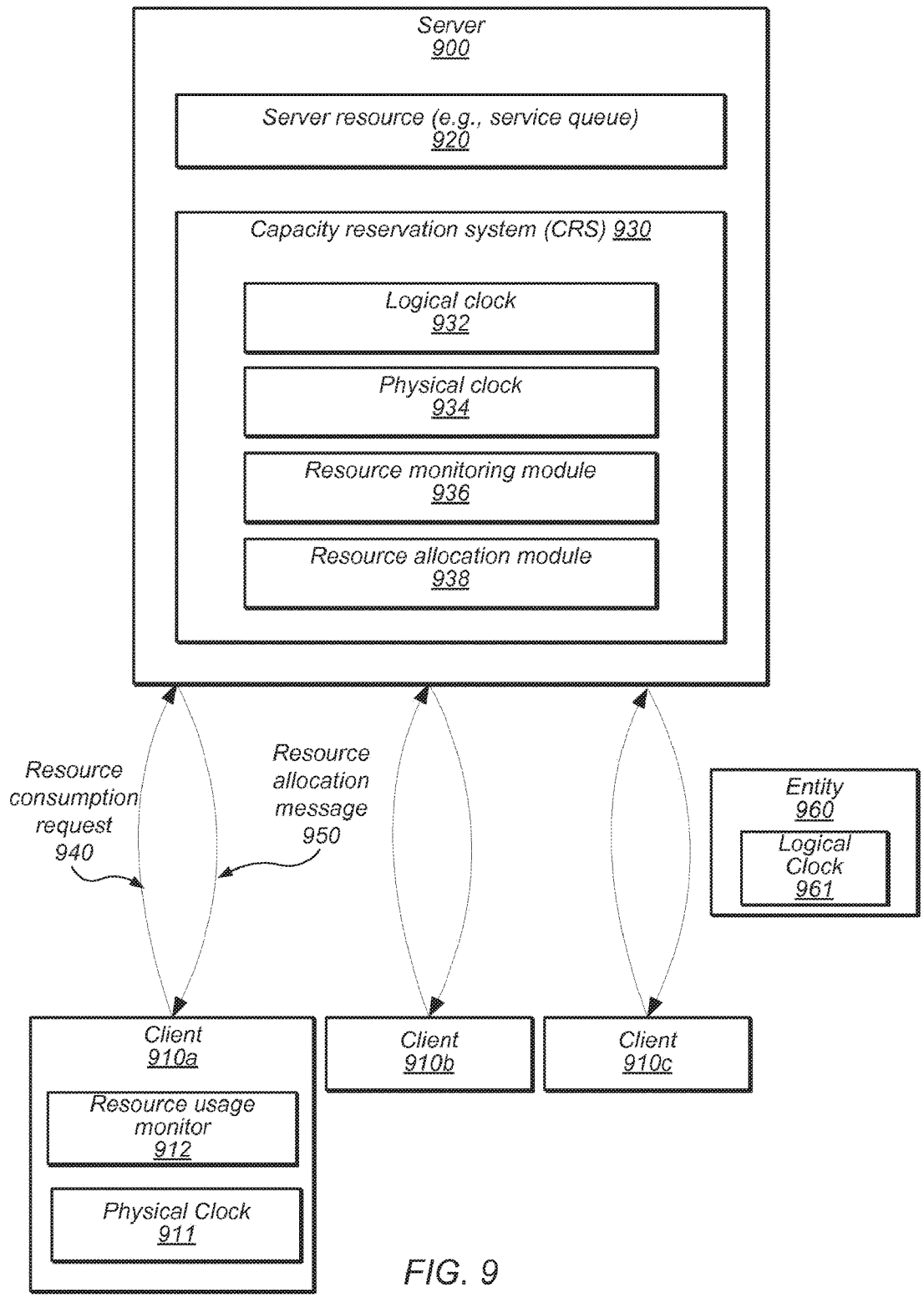
FIG. 9 is a block diagram of an embodiment of a client-server system configured to implement a resource allocation protocol.

FIG. 9 illustrates an embodiment of a system including a server and several clients, where the server and clients collectively implement a load-management protocol, also referred to as a resource allocation protocol, to protect the server from becoming overloaded by client requests. In the illustrated embodiment, server 900 is configured to communicate with several clients 910a-c. Additionally, server 900 may be configured to implement a server resource 920 as well as a capacity reservation system 930. In turn, capacity reservation system 930 may be configured to implement a logical clock 932, a physical clock 934, a resource monitoring module 936, and a resource allocation module 938. In other embodiments, any number of servers 900 and/or clients 910 may be implemented.

In some embodiments, server 900 and/or individual clients 910 may be implemented as respective instances of a standalone computer system, such as computer system 1300 shown in FIG. 13 and discussed below. In other embodiments, server 900 and/or individual clients 900 may correspond to functionality that may not map directly to the boundaries of a particular computer system. For example, server 900 may correspond to a computing service that, during operation, may be distributed across several computer systems operating in concert. Similarly, an individual client 910 may correspond to a process or application that may execute alongside other processes or applications on a single computing device. Generally speaking, any suitable mapping of server 900 and/or clients 910 to underlying hardware may be employed.

As shown, server 900 includes a server resource 920. Generally speaking, server resource 920 may correspond to any finite resource that may be subject to allocation or control. For example, server resource 920 may correspond to a queue having a finite number of slots that can be occupied by requests at a given time. In such an embodiment, individual queue slots may be allocated to clients 910 for their use. However, server resource 920 may be allocated to clients 910 according to any suitable quantum of resource utilization that clients 910 are capable of tracking. For example, server resource 920 may be allocated according to time-based metrics, such as requests per second, cycles per second, bits per second, and so forth. It is noted that although server resource 920 may correspond to a finite resource, it need not be a static resource. For example, it may be possible for the capacity of server resource 920 to increase or decrease over time as part of a dynamic capacity management strategy.

In some embodiments, server resource 920 may correspond to some resource that is implemented by server 900 itself. For example, server 900 may implement a elements of a distributed lock facility, such as the primus node of the DLM discussed above. In such an embodiment, server resource 920 may correspond to the incoming queue of change requests to be processed by the primus node. However, in other embodiments, server resource 920 may correspond to some resource that is not necessarily implemented by server 900. For example, server 900 may act as a load management gateway or front end for some other system, such as a database system having a finite query processing capability, a transaction-based storage service having a finite storage transaction processing capability, a communication gateway having finite bandwidth, or the like. (Of course, in various embodiments, server 900 may actually implement any of these types of systems, rather than serving only to provide load management for such systems.)

Because of the finite capacity of server resource 920, excessive utilization of server resource 920 by clients 910 may cause performance degradation. For example, if server 900 accepts more requests for server resource 920 than can be efficiently processed, request processing throughput may fall and the average processing latency to service a request may rise, in some cases dramatically. In some instances, server 900 may refuse client requests if its workload becomes too great. However, if server 900 is already overloaded, any additional amount of client request processing may present a further ill-afforded processing burden, even if server 900 merely discards or responds negatively to client requests. Moreover, in some scenarios, simply refusing client requests without further coordination between clients and server 900 may result in pathological system behavior, such as oscillation in processing throughput, client deadlock or starvation, or other suboptimal behaviors.

In some embodiments, capacity reservation system (CRS) 930 may be configured to implement a resource allocation protocol in cooperation with clients 910 in order to decrease the likelihood that server 900 will become overloaded by client requests. In the illustrated embodiment, CRS 930 implements a logical clock 932, a physical clock 934, a resource monitoring module 936, and a resource allocation module 938. In various embodiments, CRS 930 and its various components may be implemented by dedicated hardware or by computer-executable instructions stored by a computer-accessible medium, as discussed in greater detail below. It is noted that the illustrated arrangement of CRS 930 is chosen only to facilitate explanation. In other embodiments, the functionality implemented by CRS 930 may be implemented by or partitioned across software and/or hardware in a manner different than that shown. For example, resource monitoring module 936 and resource allocation module 938 may be combined with each other and/or with other aspects of CRS 930.

During operation, CRS 930 may receive resource consumption requests 940 from clients 910, process those requests according to a resource allocation protocol, and return resource allocation messages 950 to clients 910. In some embodiments, the primary responsibility for controlling client access to server resource 920 lies with server 900 (e.g., via CRS 930), rather than with clients 910. That is, server 900 may be the ultimate authority for determining resource allocation, in contrast to a decision process implemented by clients 910 (e.g., as in a "smart client" approach). Moreover, in some embodiments, the protocol implemented by CRS 930 may be a cooperative one. That is, rather than enforcing resource allocation decisions (e.g., by policing clients 910 and restricting those that do not comply), the protocol may assume that clients 910 voluntarily abide by resource allocation decisions. Although cooperative protocols may be abused by poorly-behaved clients 910, assuming that clients 910 are well behaved may improve overall efficiency and performance of the protocol (e.g., by reducing the overhead that would be necessary to monitor and enforce compliance).

Figure 10:
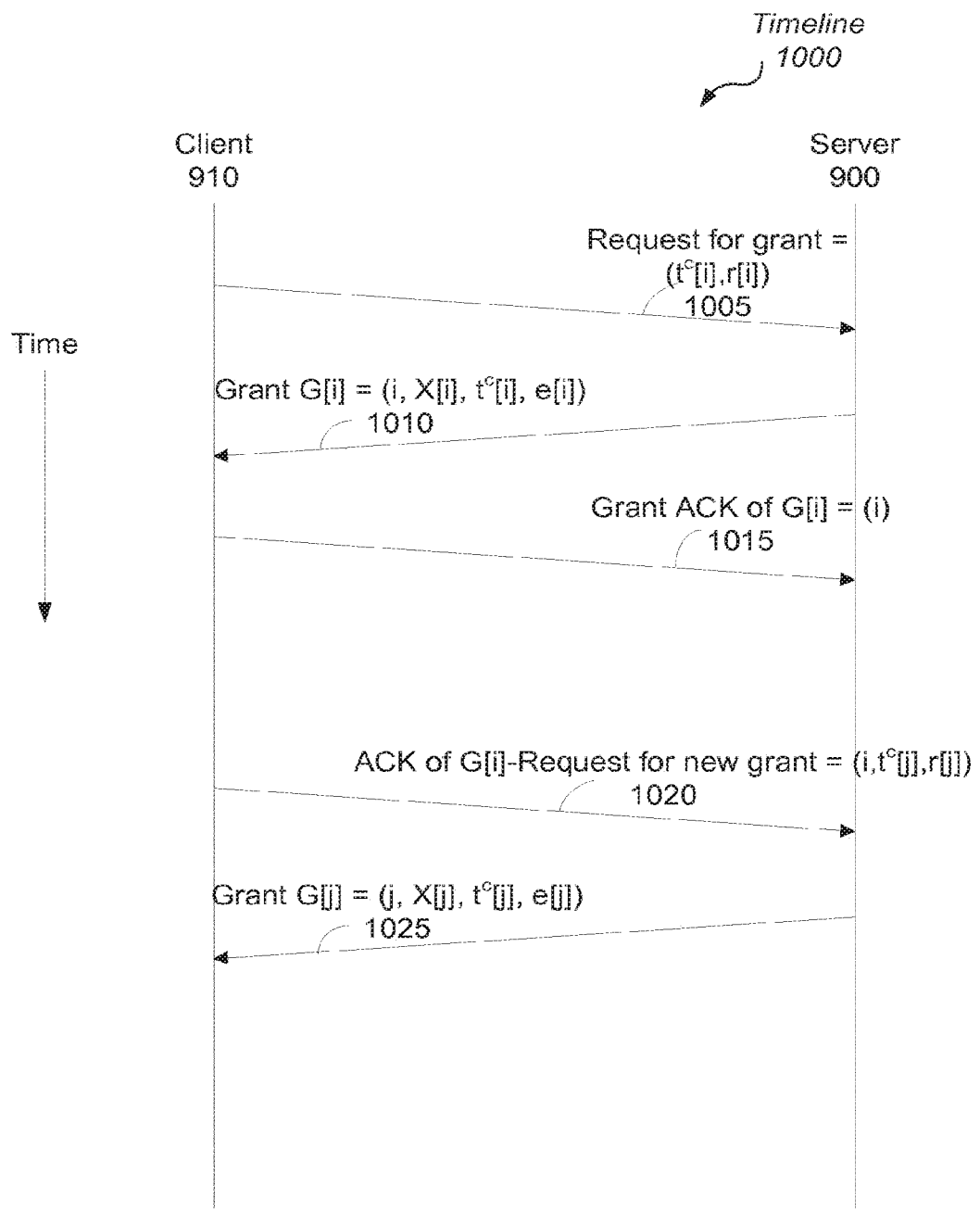
FIG. 10 is a timeline illustrating several examples of message exchange according to an embodiment of a resource allocation protocol.

FIG. 10 illustrates a timeline 1000 that shows several types of messages that may be exchanged between clients 910 and server 900 according to an embodiment of a resource allocation protocol. In the illustrated embodiment, messages are illustrated as directed arrows from client to server and vice versa, where the passage of time is indicated along the vertical axis. In some embodiments, the resource allocation protocol messages passed between clients 910 and server 900 may conveyed in an asynchronous and possibly lossy fashion. That is, the amount of time required to convey a message in either direction may not be bounded or consistent, messages may not arrive in the same order in which they were transmitted, and message arrival may not be guaranteed at all (i.e., it is possible that messages may be lost prior to delivery, and that such losses may not be detected or corrected by the protocol used for message transmission). In some embodiments, it is possible that messages conveyed using the message transmission protocol may be duplicated. For example, a given message may be received more than once, even though it might have been transmitted only once. Alternatively or additionally, a sender may in some instances send multiple identical messages.

The version of the protocol shown in FIG. 10 assumes that server 900 implements logical clock 932 and physical clock 934. In an embodiment, logical clock 932 may be implemented as an integer event counter that consistently increases (or, in some embodiments, decreases) with the passage of time, though at a rate that need not have any particular relationship to physical time. For example, the actual amount of time that elapses between successive changes in logical clock 932 may be arbitrary and variable. By contrast, embodiments of physical clock 934 may change at a known rate, such that they consistently measure elapsed time. Individual clients 910 may each instantiate an instance of a physical clock 911 that progresses at the same rate as physical clock 934. The value of logical clock 932 that corresponds to a particular event (such as a request or transaction) may be denoted i, and the value of client and server physical clocks corresponding to an event having logical timestamp i may be respectively denoted $t^c[i]$ and $t^s[i]$ (To simplify the following discussion, only the interaction between single client 910 and server 900 will be considered. However, multiple different clients 910 may each interact with server 900, and each such client may have a distinct physical clock that may differ from the others.)

Messages 1005-1015 illustrate one example of an interaction that may occur between client 910 and server 900 according to an embodiment of the resource allocation protocol. In the illustrated embodiment, a client 910 may request access to server resource 920 by sending a request message 1005 that includes, as parameters, an indication of the client's current physical clock $t^c[i]$ and an indication of the client's request for resources r[i]. The metric r[i] may correspond to any suitable indication of a client's resource demand, such as an indication of the client's current or projected resource utilization. It is noted that the logical timestamp i with which these parameters are associated may be determined by server 900 rather than client 910. For example, i need not be explicitly indicated by client 910 as part of request message 1005, and may in fact be determined by server 900 after the fact (e.g., after request message 1005 is received). That is, logical timestamp i may not actually be known at the time a client's request occurs. The inclusion of a logical timestamp reference in the client requests shown in FIG. 10 is meant to illustrate the correspondence of a request and its parameters to an eventual grant from the global perspective of the system as a whole, rather than from the limited perspective of the client. It is noted that client 910 need not store any state regarding a request for a grant subsequent to sending the request.

The event of a resource grant (that is, the resource-granting transaction associated with a particular logical timestamp i) may be denoted G[i]. Thus, in FIG. 10, request message 1005 is denoted as a "request for grant" that includes the parameters listed to the right of the "=" sign. A similar notation is used with respect to the other messages shown in FIG. 10.

In response to receiving request message 1005, server 900 may evaluate the request in order to determine how to respond to it. For example, resource allocation module 938 may determine how much of server resource 920 can be granted to the client based on the request r[i] as well as the utilization of server resource 920 by other clients, as may be monitored by resource monitoring module 936. It is noted that server 900 need not respond to a request immediately, or at all. For example, server 900 may respond to requests for grants only when it has the ability to actually grant some amount of server resource 920, and may otherwise ignore requests.

To grant a portion of server resource 920 to a requesting client 910, server 900 may convey grant message 1010. In the illustrated embodiment, grant message 1010 that is associated with grant G[i] may include an indication of the server's logical clock associated with the grant, i, as well as a measure of the granted amount of server resource 920, X[i]. Grant message 1010 may also include an echo of the client's physical clock included in the original request, $t^c[i]$, as well as an expiration time for the grant, e[i]. In some embodiments, server 900 may increment its logical clock 932 on each grant, such that value i may be unique to each grant.

Echoing the client's physical clock in the grant may enable the requesting client 910 to determine when the grant should expire, in embodiments where the expiration time e[i] is expressed relative to the client's physical clock 911 rather than in absolute terms. Generally speaking, expiration time e[i] may define (either in absolute terms or relative to $t^c[i]$, as mentioned above) a time by which the requesting client 910 is expected to cease using server resource 920, unless the requesting client 910 subsequently obtains a later-expiring grant from server 900. In various embodiments, the expiration time of a grant may be expressed relative to different time references. For example, the expiration time may be expressed relative to a physical clock such as the client's own physical clock $t^c[i]$ or the server's physical clock $t^s[i]$. The expiration time may alternatively be expressed relative to a logical clock such as logical clock 932, or relative to a different logical clock 961 maintained by an entity 960 other than server 900. In some embodiments, the expiration time of a grant may be expressed relative to multiple different references, such as a combination of the foregoing. For example, a grant may expire upon the earliest or latest to occur of a physical timestamp measured relative to a physical clock and a logical timestamp measured relative to a logical clock. Finally, it is noted that the use of a grant expiration time is an optional feature that may be omitted entirely in some embodiments, without loss of generality with respect to the examples discussed herein.

The requesting client 910 may begin utilizing its grant of server resource 920 immediately upon receiving grant message 1010 (subject to the grant not already having expired, which may occur if the message is delayed). It may acknowledge the grant by sending an acknowledgement message 1015 that indicates an acknowledgement of grant G[i]. In the illustrated embodiment, message 1015 includes the logical timestamp i corresponding to the grant G[i] that the requesting client 910 is acknowledging. In some embodiments, once a client 910 receives a grant corresponding to logical timestamp i, that client 910 may ignore any subsequently-received grant indicating a logical time k that precedes i (e.g., when the value k is less than i, in the case of consistently increasing logical clock values), as might occur when grant messages are conveyed out of order. That is, client 910 may ignore a later-received grant G[k] that was in fact granted by server 900 prior to an earlier-received grant G[i]. (In some instances, the client may also discard or disregard any previously-received grant indicating a logical time k that precedes i.) In some embodiments, once a client 910 acknowledges a grant G[i] corresponding to logical timestamp i, server 900 may discard any state corresponding to any earlier grant to that client 910.

In the sequence of messages 1005-1015, acknowledgement message 1015 is shown as a distinct message from request message 1005. However, in some embodiments, a client's acknowledgement of a previous grant G[i] may be combined with or "piggybacked" onto a subsequent request for a new grant. One example of a combined acknowledgement-request message 1020 is shown in FIG. 10. (It is contemplated that in this example, message 1020 may be sent as an alternative to the simple acknowledgement message 1015 discussed above.) In this example, in addition to sending the value i that corresponds to the acknowledged grant G[i], the requesting client 910 may send its most current physical clock $t^c[j]$ and resource request r[j] to indicate its request for a new grant. Upon receiving acknowledgement-request message 1020, server 900 may update its state to reflect the acknowledgement of grant G[i] (e.g., by discarding its state for earlier grants as described above).

In various embodiments, server 900 may either immediately begin processing the new request $t^c[j]$, r[j], or may store the new request for processing according to a different schedule. Eventually, once server 900 has processed the new request and determined a new grant G[j], it may send grant message 1025 including a logical clock value j corresponding to the G[j], a measure of the granted resource X[j], an echo of the client's physical clock $t^c[j]$, and an expiration time for the new grant e[j]. In some instances, interaction between requesting client 910 and server 900 may proceed via a repeated exchange of messages having the general format of messages 1020 and 1025.

Figure 11:
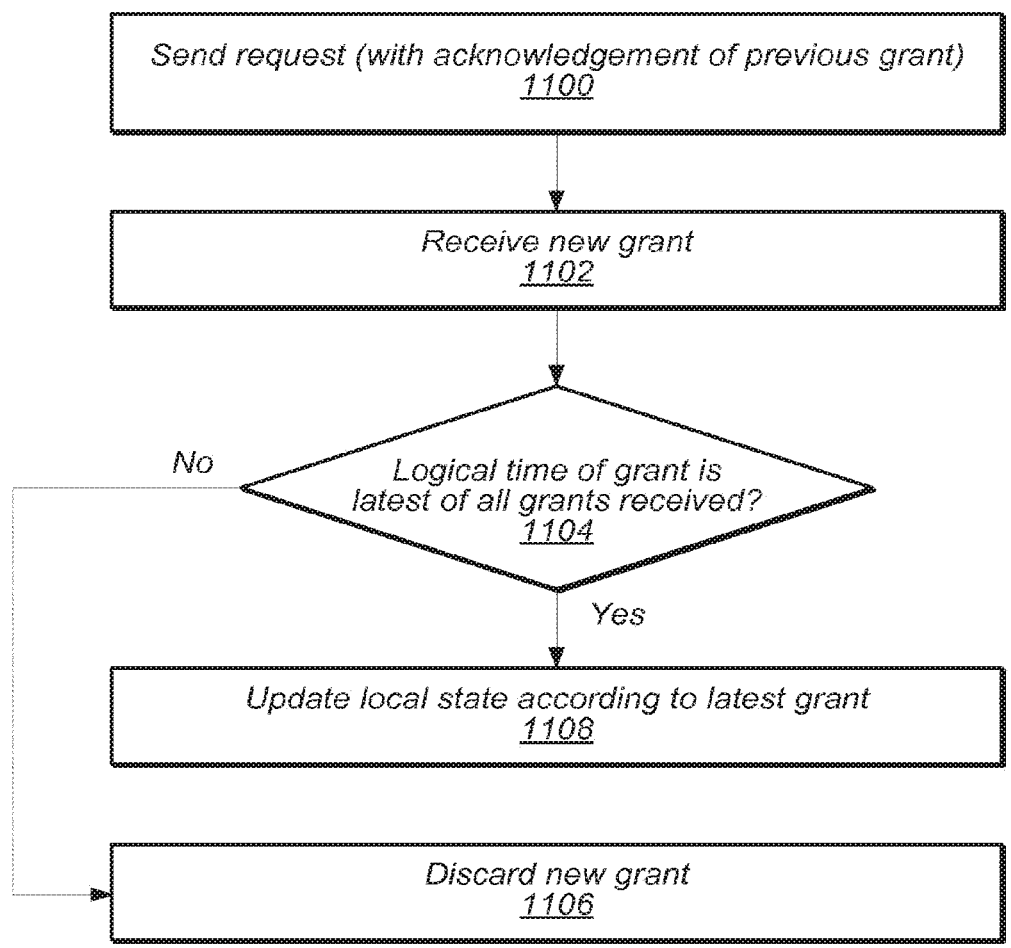
FIG. 11 is a flow chart illustrating an embodiment of a method of operation of a client according to an embodiment of a resource allocation protocol.

FIG. 11 illustrates an embodiment of a method of operation of a client 910 that implements an embodiment of the resource allocation protocol similar to that discussed above. Operation begins at 1100 where client 910 sends a resource request to server 900. For example, client 910 may send a request message 1005 as discussed above with respect to FIG. 10. In some instances, the request may also include an acknowledgement of a previous grant, as in the case of combined acknowledgement-request message 1020 discussed above. However, it is not essential that grant acknowledgements and resource requests be combined in this manner.

At 1102, client 910 receives a new grant from server 900. For example, client 910 may receive a grant message 1010 corresponding to a grant G[i] as discussed above. It is noted that the newly received grant need not necessarily correspond to the most recent request sent by client 910. For example, it is possible that client 910 might have several outstanding later requests that have not yet been received or processed by server 900 at the time a grant of an earlier request is received.

Moreover, it is possible that grants may be received out of order with respect to the original requests. Accordingly, the grant received at 1102 may actually correspond to a logical timestamp j that precedes a logical timestamp k of a grant G[k] that has already been received by client 910 prior to receipt of the grant G[j]. As noted above, in some embodiments, client 910 may disregard a newly received grant having an earlier logical time than a previously received grant. Correspondingly, at 1104, client 910 may examine the logical timestamp of the newly received grant to determine whether it is the latest (i.e., most recent) of all previously received grants. If not, client 910 discards the new grant at 1106.

If the newly received grant is the most recent of all previously received grants, then at 1108, client 910 may update its local state according to the information received in the grant (e.g., in the message indicative of the grant that is conveyed by server 900). For example, client 910 may update the expiration time of the grant as well as its allocated amount of server resource 920 to reflect the grant information, and may proceed to utilize server resource 920 in accordance with the terms of the grant.

Independent of its processing of requests and grants, client 910 may monitor its usage of server resource 920 to ensure that it is consistent with the terms of previously received grants. For example, as shown in FIG. 9, clients such as client 910a may include resource usage monitor 912. During operation, monitor 912 may be configured to monitor client 910a's usage of server resource 920 to ensure that such usage complies with the terms of the resource allocation protocol. Monitor 912 (or other functionality within client 910) may also monitor the expiration times of grants and may instruct client 910 to cease using server resource 920 in the event its grant expires.

As noted above, in some embodiments the resource allocation protocol implemented by clients 910 and server 900 may be cooperative in nature, such that clients 910 are expected but not forced to comply with the protocol. (Such a protocol may also be referred to as being advisory or permissive.) Accordingly, while clients 910 may implement strict protocol compliance in some embodiments, in other embodiments monitor 912 may be configured to permit temporary excursions from the protocol in order to facilitate other operational goals. For example, suppose a client 910 is nearly completion of a lengthy and/or performance-critical transaction involving server resource 920 at the time its grant expires. In some instances, monitor 912 may permit client 910 to temporarily extend its usage of server resource 920 after its grant has expired in order to complete its transaction.

Also, in various embodiments, clients 910 may issue resource requests according to various schemes or protocols. For example, in some embodiments, a client 910 may issue a new resource request in response to particular conditions, such as a change (either positive or negative) in its current or projected demand for server resource 920, or when a certain amount of time remains before its most recent grant expires. In other embodiments, a client 910 may issue resource requests more or less continually. For example, in the combined acknowledgement-request embodiment discussed above, a client 910 may send a new resource request each time it acknowledges a previous grant, such that at most times, the client 910 has an outstanding resource request pending. Although such an approach might increase the overall amount of message traffic between clients 910 and server 900, it may also enable more frequent updating of resource allocations with respect to client demand, which in turn may result in more efficient resource utilization over time.

As discussed above, when server 900 receives a resource request from a client 910, it determines how much of the capacity of server resource 920 will be allocated to the requesting client 910 (which, under some circumstances, might be none) and communicates this to the requesting client 910 via a grant message. In order to ensure that server resource 920 does not become overloaded by requests, server 900 may implement a policy that takes into account the outstanding resource grants to other clients 910 when deciding how to respond to a request from a particular client 910.

According to an example formulation of such a policy, in a system with some number of clients k, at any given time, each of the clients 910 may behave as though it has exclusive access to some amount of resource $C_k$, based on the most recent grant seen by each client 910. To prevent server resource 920 from becoming overloaded, at any given time, the sum of all $C_k$ should not exceed the total amount of available resource N. In some embodiments, server 900 may attempt to satisfy this constraint by maintaining for each client 910 some variable amount of resource $S_k$, by allocating resources to each client 910 such that for each k, $S_k \geq C_k$, and such that the sum of all $S_k$ does not exceed N. $S_k$ may then serve as an upper bound on the amount of resource that may be allocated to a given client 910. That is, server 900 need not allocate the full amount $S_k$ (e.g., if the client's request is for less than $S_k$, then server 900 may only allocate enough resource to satisfy the requested amount), and server 900 should not allocate more than the full amount $S_k$. In some embodiments, even though server 900 may determine an upper bound for resource allocation (such as $S_k$), under some circumstances server 900 may refrain from enforcing the upper bound. For example, server 900 may permit temporary excursions from the protocol and may deliberately allocate some amount of resource to a given client 910 that exceeds the bound determined for the given client 910. This may occur, for example, in response to other conditions detected by server 900, such as a temporary need to service a time-critical or performance-sensitive task. Generally, any condition that may cause server 900 to refrain from enforcing a bounded resource allocation may be referred to as a resource allocation policy exception.

Figure 12:
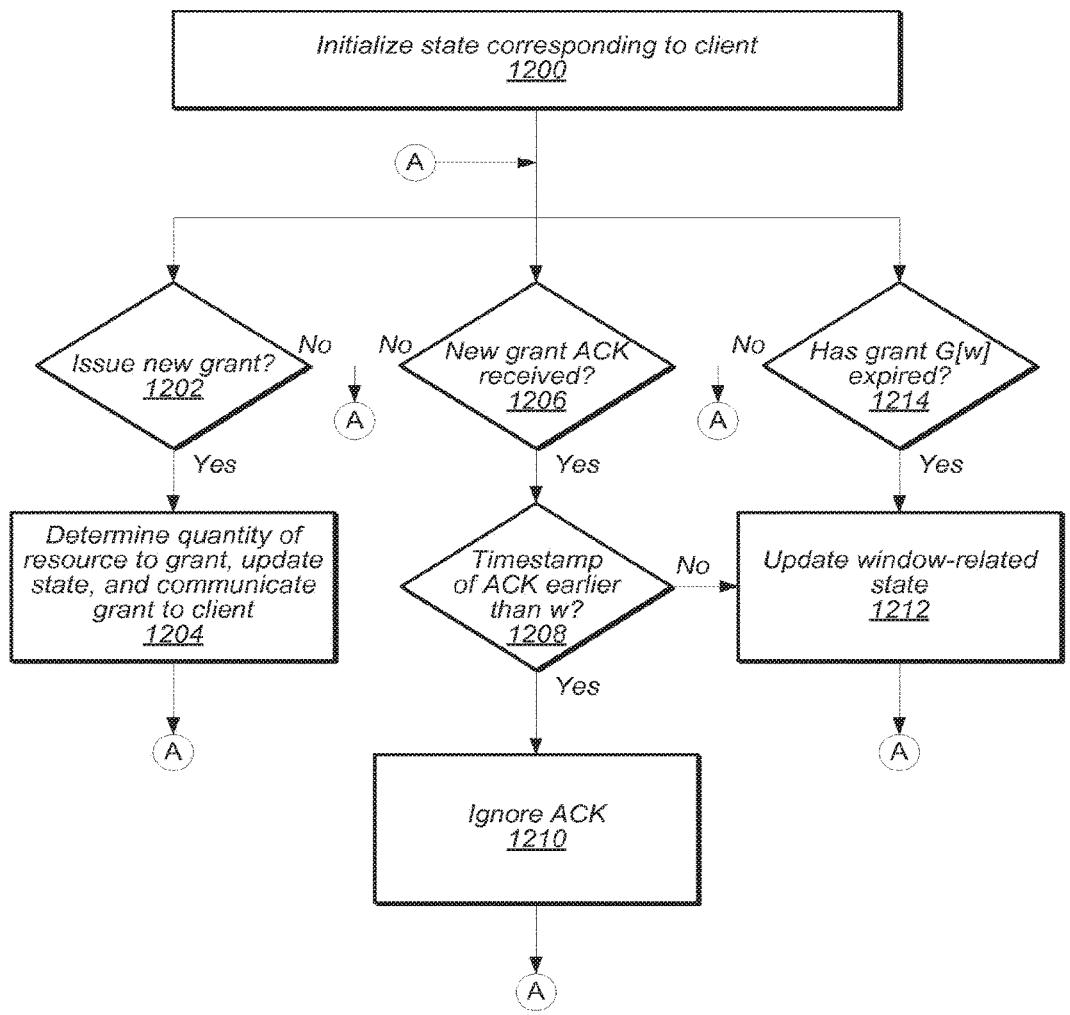
FIG. 12 is a flow chart illustrating an embodiment of a method of operation of a server according to an embodiment of a resource allocation protocol.

FIG. 12 illustrates an embodiment of a method of operation of server 900 by which server 900 may determine the bounded amount of resource $S_k$ corresponding to a particular client 910. In the illustrated embodiment, operation begins at 1200 where server 900 initializes state corresponding to particular client 910. In one example implementation, server 900 may maintain the following state for each client 910:

G[earliest], which denotes the oldest outstanding or "live" grant to the client 910, and may be determined as the maximum value of the logical timestamp received in any grant acknowledgement from the client (e.g., via an acknowledgement message 1015 or an acknowledgement-request message 1020, as discussed above). In some embodiments, earliest may initially be set to 0 or another initial timestamp value. Logical timestamp earliest may also be referred to as the "earliest logical timestamp."

w, a logical time that divides all grants issued by server 900 to the client 910 into two windows: those issued before w, and those issued after. As discussed below, w may be updated upon receipt of a grant acknowledgement from client 910. In some embodiments, before any grant acknowledgement has occurred, w may be initialized to the same value as earliest. Logical timestamp w may also be referred to as the "window logical timestamp."

B, the maximum outstanding quantity of server resource 920 granted to client 910 prior to timestamp w. For the version of grant message 1010 discussed above, B may be selected as the maximum value of X[i] for some grant G[i], where grant G[i] occurs prior to grant G[w] but occurs after (or is identical to) grant G[earliest] (i.e., earliest≤i<w).

A, the maximum outstanding quantity of server resource 920 granted to client 910 at or after timestamp w. For the version of grant message 1010 discussed above, A may be selected as the maximum value of X[i] for some grant G[i], where grant G[i] occurs after (or is identical to) grant G[w] (i.e., i≥w).

$t^s[w]+e[w]$, the time at which grant G[w] expires, measured relative to the server's physical clock.

$t_e^s$, the time at which the last issued grant to client 910 expires, which will ordinarily be advanced by new grants. If the server's physical clock reaches this time, client 910 may be considered to have expired, and all state related to client 910 may be removed until a new resource request is received.

However, it is noted that this enumeration of state that may be maintained by server 900 represents only one possible state configuration, and that numerous suitable alternative configurations are possible and contemplated.

In the above configuration, the bounded amount of resource $S_k$ corresponding to client 910 may be given as the maximum of A and B. That is, $S_k = \max(A, B)$.

In the above configuration, the bounded amount of resource $S_k$ corresponding to client 910 may be given as the maximum of A and B. That is, $S_k = \max(A, B)$. However, in some embodiments, $S_k$ may not be explicitly determined and stored, but instead implicitly determined when needed as a function of A and B.

At 1202, server 900 may determine whether it is time to issue a new grant to client 910. For example, server 900 may determine that there is a pending resource request from client 910 that has not yet been processed. In some embodiments, other factors may be taken into account when determining whether to process a new grant for client 910. For example, resource requests need not be processed immediately upon receipt; in some instances, server 900 may implement an update schedule that governs how often such requests may be processed.

If it is time to issue a new grant G[k] to client 910, then at 1204, server 900 may determine the quantity X[k] of server resource 920 to be granted, update its state for client 910, and communicate the grant G[k] to client 910 (e.g., via grant message 1010). It is contemplated that X[k] may be determined according to any suitable technique, subject to the requirement that X[k] should not be greater than $S_k$. For example, X[k] may take into account the amount of resource requested by client 910, although various policies may prevent a client 910 from being granted all of the resource it has requested. Once X[k] is determined, the value of A may be updated with X[k] if X[k] is greater than A.

At 1206, server 900 may determine that a new grant acknowledgement containing a logical time i (that is, an acknowledgement of an earlier grant G[i]) has been received from client 910 (e.g., via an acknowledgement message 1015 or an acknowledgement-request message 1020). Using this acknowledgement, server 900 may determine whether to update timestamp w. In the illustrated embodiment, if grant G[i] is earlier than grant G[w] (i.e., if i<w) as determined at 1208, the newly received acknowledgement may be ignored at 1210.

By contrast, if grant G[i] is later than (or in some embodiments, identical to) grant G[w] (i.e., if i≥w), server 900 may update its window-related state at 1212. In some embodiments, this may include updating the timestamp value w to reflect a more current logical timestamp value. For example, timestamp w may be set to the current value of server 900's logical clock 932 at the time the new grant acknowledgement is processed. Additionally, in some embodiments, updating window-related state may include storing the value of A into B and resetting A to 0. G[earliest] may also be updated to reflect that G[i] is now the oldest grant acknowledged by client 910. (In some embodiments, only the timestamp earliest may be separately saved and updated, rather than all information associated with grant G[earliest].)

Figure 13:
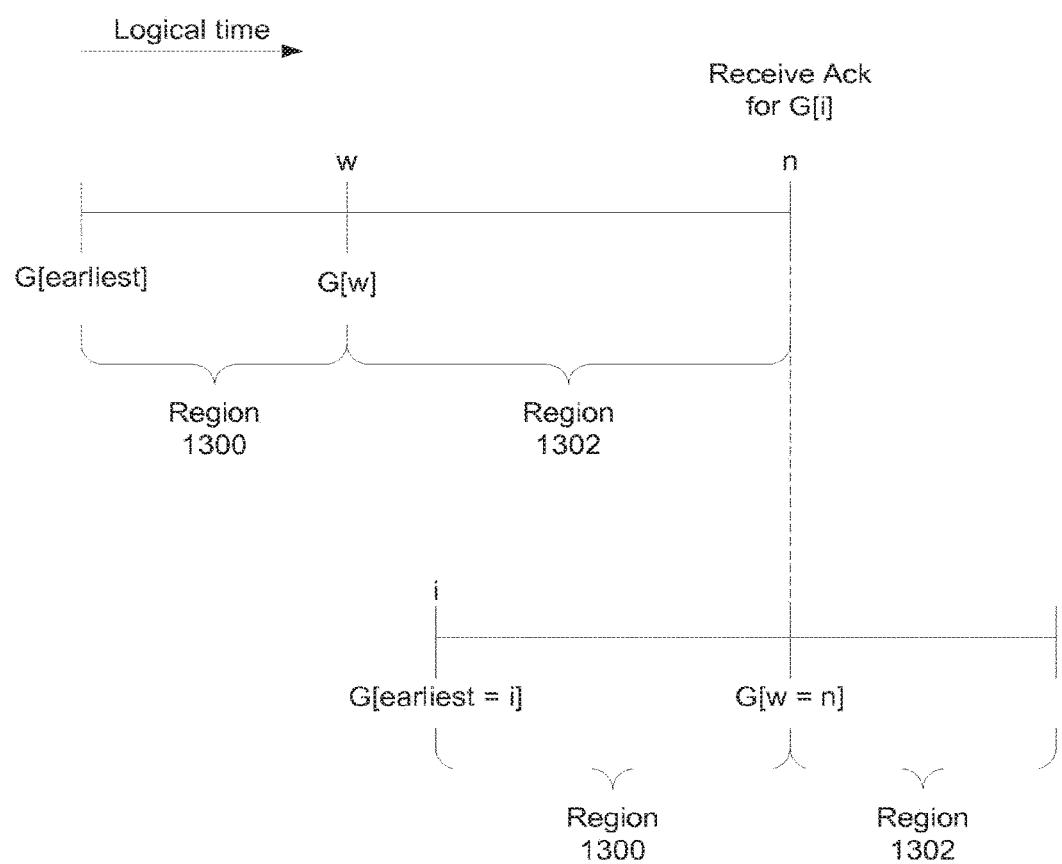
FIG. 13 illustrates an example of how window-related state may be updated by a server using an embodiment of a resource allocation protocol.

FIG. 13 illustrates an example of how window-related state may be updated as described above. Specifically, FIG. 13 shows two versions of a logical timeline. The top version illustrates the relative arrangement of grants G[earliest] and G[w] prior to arrival of a grant acknowledgement corresponding to grant G[i]. As shown, logical timestamp w divides the timeline into two regions 1300 and 1302 falling before and after grant G[w], respectively.

At logical time n, a grant acknowledgement for grant G[i] is received, where i is greater than or equal to w. That is, the grant G[i] that is being acknowledged is either grant G[w] or a grant later than G[w]. Upon processing by server 900, this may cause the positioning of regions 1300 and 1302 to shift along the logical timeline, as illustrated by the bottom timeline. Specifically, timestamp earliest may be updated to timestamp such that grant G[earliest] now corresponds to grant G[i]. Also, timestamp w may be updated to timestamp n, such that grant G[w] now corresponds to grant G[n], causing regions 1300 and 1302 to shift to the right along the logical timeline, as shown.

Referring once again to FIG. 12, in some embodiments, the expiration of grant G[w] may cause the window state to be updated in a manner similar to receipt of a grant acknowledgement. Specifically, at 1214, server 900 may determine that its physical clock $t^s$ exceeds the value $t^s[w]+e[w]$, which may cause server 900 to update its window-related state at 1212 in the manner described above.

It is noted that the exact handling of boundary conditions may differ in different embodiments. For example, in some embodiments, a test described above as determining whether some quantity is strictly greater than/less than another quantity may instead be implemented as determining whether some quantity is greater than or equal to/less than or equal to another quantity, or vice versa.

Example Computer System Embodiment

Figure 14:
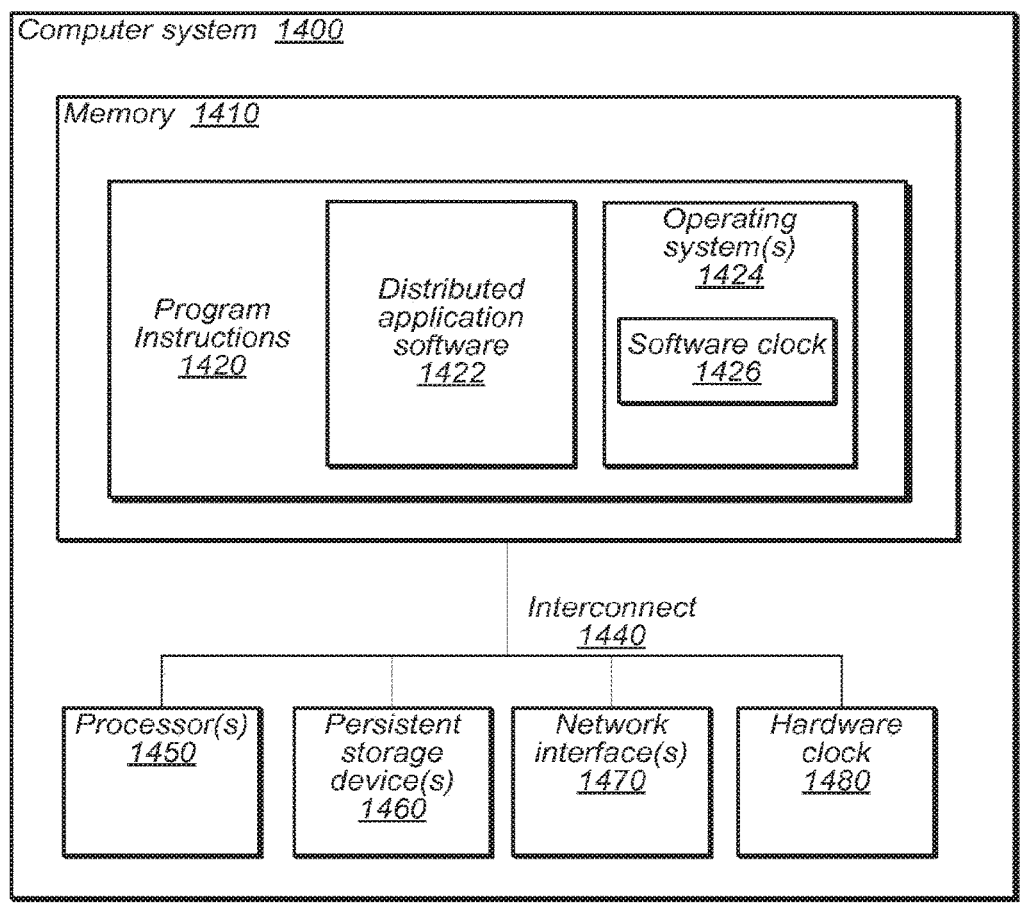
FIG. 14 is a block diagram illustrating an embodiment of a computer system.

FIG. 14 is a block diagram illustrating a computer system configured to execute a client, server, DLM node, and/or other participant in a distributed system configured to implement various methods described herein, according to some embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1450, any of which may include multiple cores, which may be single or multi-threaded. The computer system 1400 also includes one or more network communication devices (network interface 1470) for communicating with other systems and/or components over a communications network (e.g. Internet, LAN, etc.). For example, a client application executing on system 1400 may use network interface 1470 to communicate with a DLM. In another example, a DLM node server application executing on computer system 1400 may use network interface 1470 to communicate with other DLM node server that may be implemented on other computer systems.

In the illustrated embodiment, computer system 1400 also includes one or more persistent storage devices 1460. In various embodiments, persistent storage devices 1460 may correspond to disk drives, tape drives, solid state memory, other mass storage devices, or any other persistent storage device.

Computer system 1400 also includes a hardware clock 1480. For example, hardware clock 1480 may be implemented using a clock chip, which may be supported by the computer system BIOS. In such embodiments, BIOS services may be available by which software programs executing on computer system 1400 (e.g., client, DLM node, operating system) may read the time. In some embodiments, client and/or node software executing on the system may use hardware clock 1480 to calculate client and/or node staleness as described above. Client and/or node software may use an operating system software clock, such as software clock 1426 of operating system 1424 when calculating staleness.

Computer system 1400 includes one or more memories 1410 (e.g., one or more of cache, SRAM, DRAM, RDRAM, EDO RAM, DDR 10 RAM, SDRAM, Rambus RAM, EEPROM, etc.). In various embodiments, computer system 1400 may include fewer or additional components not illustrated in FIG. 14 (e.g., displays, video cards, audio cards, peripheral devices, other network interfaces such as an ATM interface, an Ethernet interface, a Frame Relay interface, etc.)

System memory 1410 may contain program instructions 1420 that are executable by processor(s) 1450. In various embodiments, program instructions 1420 may be encoded in platform native binary, any interpreted language such as Java™ byte-code, or in any other language such as C/C++, Java™, etc or in any combination thereof.

In the illustrated embodiment, program instructions 1420 include program instructions executable to implement distributed application software 1422. In some embodiments, this software may correspond to a client application (e.g., user code 110 and/or client library 115 of client 105 in FIG. 1) configured to interact with a distributed application (e.g., DLM) and to implement various methods described herein, such as calculating staleness. In some embodiments distributed application software 1422 may implement a distributed node (e.g., a DLM node), which may be configured to communicate with one or more clients and one or more other nodes, such as to implement a distributed locking service. In some embodiments, program instructions 1420 may implement multiple separate clients, nodes, and/or other components.

In some embodiments, program instructions 1420 may include instructions executable to implement operating system 1424, which may be any of various operating systems, such as UNIX, LINUX, Solaris™, MacOS™, Windows™, etc. In various embodiments, operating system 1424 may include a software system clock 1426. In some embodiments, distributed application software 1422 may utilize software clock 1426 for determining current time and/or calculating staleness. For example, if distributed software 1422 implements a client library (such as 115), then in some embodiments, the client library may sample software clock 1426 for a clock value and send the clock value to a DLM node as part of a heartbeat, as described herein. The client library may also sample software clock 1426 to calculate a client staleness of data received from a distributed application and/or an overall staleness of such data.

Any or all of program instructions 1420, including distributed application software 1422, operating system 1424, and software clock 1426 may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

It is noted that any of the distributed system embodiments described above, or any of their components, may be implemented as one or more web services. For example, nodes 132 may present their functionality to each other and/or to clients 105 as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method, comprising:
    isolating a given node from communication with other nodes of a distributed system, in response to a determination to record a checkpoint of a shared state of the distributed system, wherein the given node isolates itself from communication with the other nodes of the distributed system, wherein the given node and the other nodes of the distributed system are implemented via one or more hardware computing devices;
    storing, by the isolated given node, the checkpoint of the shared state;
    restarting and attempting, by the isolated given node, to initialize its operating state from the stored checkpoint;
    in response to successfully initializing its operating state from the stored checkpoint:
        restoring, by the given node, communication with one or more of the other nodes of the distributed system; and
        indicating to the one or more others of the nodes of the distributed system that the stored checkpoint is valid.

2. The computer-implemented method as recited in claim 1, further comprising:
    isolating itself, by another node of the nodes of the distributed system, from communication with the distributed system, in response to a determination to store another checkpoint;
    storing, by the other isolated node, the other checkpoint;
    restarting and attempting, by the other isolated node, to initialize operating state from the other checkpoint; and
    in response to failing to successfully initialize its operating state from the other checkpoint, the other node attempting to initialize its operating state from an earlier stored checkpoint.

3. The computer-implemented method as recited in claim 2, further comprising:
    in response to successfully initializing its operating state from the earlier stored checkpoint, the other node restoring communication with one or more nodes of the distributed system and indicating to the one or more nodes that the other checkpoint is invalid.

4. The computer-implemented method as recited in claim 1, wherein the distributed system implements a distributed lock manager, and wherein the computer-implemented method further comprises receiving, the given node, a request from a client for one or more locks, and in response, issuing, by the distributed lock manager, the one or more requested locks to the client.

5. The computer-implemented method as recited in claim 1, wherein the distributed system implements a distributed data store, and wherein the computer-implemented method further comprises storing, by the given node, one or more data objects in response to receiving a request to store the one or more data objects from a given one of a plurality of clients.

6. The computer-implemented method as recited in claim 1, wherein the distributed system implements a distributed database, and wherein the computer-implemented method further comprises querying, by the given node, the distributed database in response to receiving a query request from a given one of a plurality of clients.

7. The computer-implemented method as recited in claim 1, wherein restarting, by the given node, comprises performing a normal shutdown procedure.

8. The computer-implemented method as recited in claim 1, wherein restarting, by the given node, comprises deliberately causing a runtime error in response to which the given node restarts.

9. A non-transitory computer-readable storage medium storing program instructions that when executed by a hardware computer system cause the computer system to implement:

a given node of a distributed system isolating itself from communication with other nodes of a plurality of nodes of the distributed system;

the isolated given node storing a checkpoint of a shared state of the distributed system;

the given node restarting and attempting to initialize its operating state from the stored checkpoint; and the given node is configured to respond to successfully initialize its operating state from the stored checkpoint, by:

restoring communication with one or more others of the plurality of nodes; and indicating to the one or more others of the plurality of nodes that the stored checkpoint is valid.

10. The non-transitory computer-readable storage medium of claim 9, wherein the given node is configured to respond to failing to successfully initialize its operating state from the stored checkpoint by:

attempting to initialize its operating state from an earlier stored checkpoint;

restoring communication with one or more others of the plurality of nodes; and indicating to the one or more others of the plurality of nodes that the stored checkpoint is invalid.

11. The non-transitory computer-readable storage medium of claim 9, wherein the distributed system implements a distributed lock manager, and wherein the given node is further configured to receive a request from a client for one or more locks and in response, the distributed lock manager issuing the one or more requested locks to the client.

12. The non-transitory computer-readable storage medium of claim 9, wherein the distributed system implements a distributed data store, and wherein the given node is further configured to store one or more data objects in response to receiving a request to store the one or more data objects from a given one of a plurality of clients.

13. The non-transitory computer-readable storage medium of claim 9, wherein the distributed system implements a distributed database, and wherein the given node is further configured to query the distributed database in response to receiving a query request from a given one of a plurality of clients.

14. The non-transitory computer-readable storage medium of claim 9, wherein the given node restarting comprises the given node performing a normal shutdown procedure or deliberately causing a runtime error in response to which the given node restarts.

15. A computer, comprising:
one or more hardware processors and memory storing program instructions that when executed by the one or more hardware processors implement a given node of a distributed system, wherein the given node is configured to respond to being chosen to record a checkpoint of a shared state of the distributed system, wherein to respond the given node is further configured to:

isolate itself from communication with other nodes of the distributed system;

store the checkpoint of the shared state;

restart and attempt to initialize its operating state from the stored checkpoint; and responsive to successful initialization of its operating state from the stored checkpoint:

restore communication with one or more others of the nodes of the distributed system; and indicate to the one or more others of the nodes that the stored checkpoint is valid.

16. The system of claim 15, wherein the given node is configured to, responsive to failing to successfully initialize its operating state from the stored checkpoint:

attempt to initialize its operating state from an earlier stored checkpoint;

restore communication with one or more others of the nodes; and indicate to the one or more others of the nodes that the stored checkpoint is invalid.

17. The system of claim 15, wherein the distributed system implements a distributed lock manager, and wherein the given node is further configured to receive a request from a client for one or more locks and in response, the distributed lock manager is configured to issue the one or more requested locks to the client.

18. The system of claim 15, wherein the distributed system implements a distributed data store, and wherein the given node is further configured to store one or more data objects in response to receiving a request to store the one or more data objects from a given one of a plurality of clients.

19. The system of claim 15, wherein the distributed system implements a distributed database, and wherein the given node is further configured to query the distributed database in response to receiving a query request from a given one of a plurality of clients.

20. The system of claim 15, wherein to restart the given node is configured to perform a normal shutdown procedure or deliberately cause a runtime error in response to which the given node restarts.

* * * * *